US007363398B2

(12) United States Patent
Scott

(10) Patent No.: US 7,363,398 B2
(45) Date of Patent: Apr. 22, 2008

(54) INTELLIGENT TOTAL ACCESS SYSTEM

(75) Inventor: Neil G. Scott, Honolulu, HI (US)

(73) Assignee: The Board of Trustees of the Leland Stanford Junior University, Palo Alto, CA (US)

( * ) Notice: Subject to any disclaimer, the term of this patent is extended or adjusted under 35 U.S.C. 154(b) by 528 days.

(21) Appl. No.: 10/642,022

(22) Filed: Aug. 15, 2003

(65) Prior Publication Data
US 2004/0117513 A1 Jun. 17, 2004

Related U.S. Application Data

(60) Provisional application No. 60/404,034, filed on Aug. 16, 2002.

(51) Int. Cl.
G06F 3/00 (2006.01)

(52) U.S. Cl. ............ 710/52; 704/1; 704/3; 704/9; 704/231; 704/323; 704/200; 704/270; 704/271; 704/275; 340/5.5; 340/5.51; 340/5.53; 715/700; 715/707; 715/708; 715/714

(58) Field of Classification Search ............ 710/52
See application file for complete search history.

(56) References Cited

U.S. PATENT DOCUMENTS

| 5,062,060 | A |   | 10/1991 | Kolnick ............... 364/521 |
| 5,321,608 | A | * | 6/1994  | Namba et al. ............ 704/9 |
| 5,335,323 | A |   | 8/1994  | Kolnick ............... 395/164 |
| 6,083,270 | A |   | 7/2000  | Scott .................. 703/24 |
| 6,144,989 | A |   | 11/2000 | Hodjat et al. .......... 709/202 |
| 6,260,035 | B1 | * | 7/2001 | Horvitz et al. ........... 706/60 |
| 6,272,455 | B1 | * | 8/2001 | Hoshen et al. ............ 704/1 |
| 6,434,524 | B1 |   | 8/2002 | Weber ................. 704/257 |
| 6,499,013 | B1 |   | 12/2002 | Weber ................. 704/257 |
| 6,532,444 | B1 |   | 3/2003 | Weber ................. 704/257 |
| 6,594,684 | B1 |   | 7/2003 | Hodjat et al. .......... 709/202 |
| 6,622,119 | B1 | * | 9/2003 | Ramaswamy et al. ...... 704/9 |
| 6,732,195 | B1 | * | 5/2004 | Baldwin ................ 710/6 |
| 6,795,808 | B1 | * | 9/2004 | Strubbe et al. ......... 704/275 |

(Continued)

OTHER PUBLICATIONS

Wikipedia, the free encyclopedia, "http://en.wikipedia.org/wiki/Text", Nov. 11, 2006, pp. 1-2.*

Primary Examiner—Niketa Patel
(74) Attorney, Agent, or Firm—Womble Carlyle, et al.

(57) ABSTRACT

A system for interfacing a user with an electronic device. An accessor device provides a user interface matched to the needs, abilities and intentions of the user and translates the user input commands and data into commands for the electronic device. An intelligent access port translates commands from the accessor into an input format required by the electronic device. A communication link connects the accessor device with the intelligent access port to send the translated user input commands and data from the accessor to the intelligent access port. The accessor device contains an intelligent access module and an interactive display. The intelligent access module contains a driver device for routing message packets, an interaction processor for processing incoming message packets and generating a message packet for the electronic device, and a communications channel. Communications between system components take place over a universal serial bus or over a wireless fidelity or ZigBee device. The interactive display can include a touch screen, browser, wireless transceiver and flash storage.

17 Claims, 41 Drawing Sheets

U.S. PATENT DOCUMENTS

| | | | |
|---|---|---|---|
| 6,819,677 B1 * | 11/2004 | Nouzovsky et al. | 370/466 |
| 6,964,023 B2 * | 11/2005 | Maes et al. | 715/811 |
| 7,088,220 B2 * | 8/2006 | Kotzin | 340/5.82 |
| 2001/0053277 A1 * | 12/2001 | Jun et al. | 386/70 |
| 2002/0013701 A1 * | 1/2002 | Oliver et al. | 704/231 |
| 2002/0046023 A1 * | 4/2002 | Fujii et al. | 704/231 |
| 2002/0065651 A1 * | 5/2002 | Kellner et al. | 704/231 |
| 2002/0087052 A1 * | 7/2002 | Zadrozny et al. | 600/300 |
| 2002/0099456 A1 * | 7/2002 | McLean | 700/83 |
| 2002/0178344 A1 * | 11/2002 | Bourguet et al. | 712/1 |

* cited by examiner

| Level 1<br>AUGMENT | Level 2<br>INDIVIDUAL | Level 3<br>GROUP | Level 4<br>CLUSTER | Level 5<br>ITAP | Level 6<br>Target Device |
|---|---|---|---|---|---|
| BYTE 1 | BYTE 2 | BYTE 3 | BYTE 4 | BYTE 5 | BYTE 6 |
| 0 - 255 AUGMENT accessors for each INDIVIDUAL accessor | 0 - 255 INDIVIDUAL accessors for each GROUP accessor | 0 - 255 GROUP accessors for each CLUSTER accessor | 0 - 255 CLUSTER accessors for each MASTER ITAP | 0 - 255 Individual ITAPS for each MASTER ITAP | 0 - 255 individual target devices for each ITAP |

FIG. 46

| Level 1 AUGMENT | Level 2 INDIVIDUAL | Level 3 GROUP | Level 4 CLUSTER | Level 5 ITAP | Level 6 TARGET |
|---|---|---|---|---|---|
| 00000000 | 00000000 | 00000000 | 00000000 | 1bbbbbbb → ITAP → TARGET | bbbbbbbb |
| 00000000 | 00000000 | 00000000 | bbbbbbbb → ITAP → TARGET | 0bbbbbbb | bbbbbbbb |
| 00000000 | 00000000 | bbbbbbbb → ITAP → TARGET | bbbbbbbb | 0bbbbbbb | bbbbbbbb |
| 00000000 | bbbbbbbb → ITAP → TARGET | bbbbbbbb | bbbbbbbb | 0bbbbbbb | bbbbbbbb |
| bbbbbbbb → ITAP → TARGET | bbbbbbbb | bbbbbbbb | bbbbbbbb | 0bbbbbbb | bbbbbbbb |

FIG. 53

INTELLIGENT TOTAL ACCESS SYSTEM

CROSS REFERENCE TO RELATED APPLICATION

The present patent application is a formalization of a previously filed, co-pending provisional application entitled "Intelligent Total Access System," filed Aug. 16, 2002 as U.S. Patent Application Ser. No. 60/404,034, by the inventor named in this patent application. This patent application claims the benefit of the filing date of the cited provisional patent application according to the statute and rules governing provisional patent application, 35 USC § 119(e)(1) and 37 CFR §§ 1.789(a)(4) and (a)(5). The specification and drawings of the provisional patent application are specifically incorporated herein by reference.

STATEMENT REGARDING FEDERALLY SPONSORED RESEARCH

This invention was made with Government support under contract 0071126 awarded by the National Science Foundation. The U. S. Government has certain rights in the invention.

FIELD OF THE INVENTION

The invention relates generally to a system and methods for interfacing human users with electronic devices. More specifically, it relates to a system and techniques for providing users with access to electronic devices using a personal interface matched to the needs, abilities, preferences and limitations of the user.

BACKGROUND OF THE INVENTION

The computer industry is based on a premise that all users can be served by a single basic user interface paradigm. While each manufacturer has a different interpretation of what that paradigm should be, there is some consistency in the current approach based on a Graphical User Interface (GUI) that is accessed with a keyboard and mouse. While this works for many people, there are those for whom it presents major accessibility problems. For example, many physically disabled people are unable to use the keyboard or mouse, blind people cannot see the objects displayed on a screen, deaf people cannot hear alarms or spoken messages, and learning disabled or cognitively impaired people may be confused by the visual metaphors that are used.

Traditional methods for making information technology (IT) equipment accessible to individuals with disabilities required hardware or software modifications to specific IT devices to make them accessible to specific users. While these user-specific solutions worked well in many environments, they were usually costly to implement and required building the IT equipment from the ground up for each user and each work situation. Version obsolescence is an ongoing problem because new or updated versions of existing software invariably break existing access solutions. Furthermore, different solutions are required for each computer platform and each version of its operating system. In short, these solutions enabled a person with special needs to work with a constrained range of equipment and software but did not give them the freedom to move about.

SUMMARY OF THE INVENTION

The Intelligent Total Access System (ITAS) was developed to provide individuals with access to any type of computer-based Information Technology (IT) using a personal interface matched to his or her particular needs, abilities, preferences and culture. The concept of intent driven user interfaces dramatically simplifies user interfaces by eliminating the need for users to learn specific operating scripts.

Motivation for developing the ITAS grew out of the need for people with disabilities to have the same freedom of access to IT equipment as people who have no disabilities. To achieve this, access tools must work properly with any type of IT and software and they must be portable to enable the user move about freely. The ITAS achieves this by breaking the access solution into two parts: (i) a small device called the Intelligent Total Access Port (ITAP) attaches to the IT device and emulates the standard user interfaces provided by the manufacturer, and (ii) a personal "accessor" that provides each user with his or her preferred interaction strategies and translates information and commands into formats that are recognizable by the specific user and any ITAP.

The specific objectives of the ITAS are: (i) to provide the mechanisms that enable individuals who have disabilities with the freedom to use interfaces of their own choice with any IT device that is equipped with an ITAP; (ii) to develop intelligent user interfaces that eliminate the need for users to learn a different interaction strategy for each IT device; (iii) to incorporate intent-driven technologies that enable interfaces to respond to natural human text and gestures; and (iv) to implement these intelligent, intent-driven interfaces with small processors that can be easily embedded into low-cost appliances and tools.

DESCRIPTION OF THE DRAWINGS

These and other advantages and aspects of the present invention will become apparent and more readily appreciated from the following detailed description of the presently preferred exemplary embodiments of the invention taken in conjunction with the accompanying drawings, of which:

FIG. 46 illustrates address bytes used in the ITAS addressing scheme.

FIG. 53 illustrates addresses for ITAPs connected to ITAS modules at each level.

DETAILED DESCRIPTION OF THE INVENTION

Figure 1:
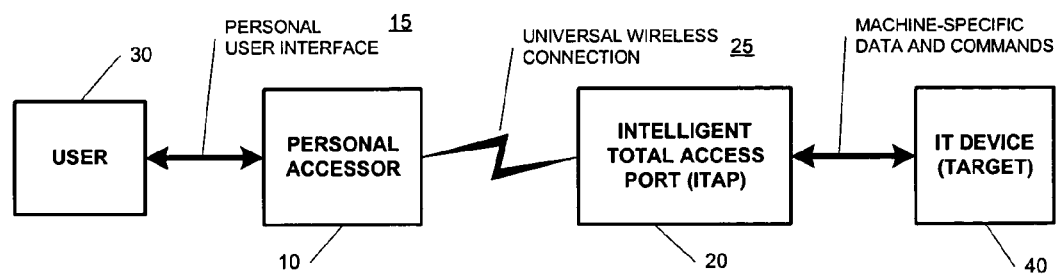
FIG. 1 illustrates the functional components of the present invention.

The following description of the invention is provided as an enabling teaching of the invention and its best, currently known embodiment. Those skilled in the art will recognize that many changes can be made to the embodiments described while still obtaining the beneficial results of the present invention. It will also be apparent that some of the desired benefits of the present invention can be obtained by selecting some of the features of the present invention without utilizing other features. Accordingly, those who work in the art will recognize that many modifications and adaptations of the invention are possible and may even be desirable in certain circumstances and are part of the present invention. Thus, the following description is provided as illustrative of the principles of the invention and not in limitation thereof since the scope of the present invention is defined by the claims.

Various figures show different aspects of the system, and, where appropriate, reference numerals illustrating like components in different figures are labeled similarly. It is understood that various combinations of components other than those specifically shown are contemplated. Further, separate components are at times described with reference to a particular system embodiment, and while such description is accurate, it is understood that these components, with the variants described, are independently significant and have patentable features that are described separate and apart from the system in which they are described.

U.S. Pat. No. 6,083,270 having the same inventor and the same assignee describes devices and methods for interfacing human users with electronic devices. In particular, it describes a communication system that includes a speech synthesis and recognition system which is connected to an accessor total access port, a device connected to a target total access port, and a total access link between the accessor and target total access ports. Universal data packets are transmitted between total access ports over the access link. This patent is incorporated by reference in its entirety herein.

Overview of the ITAS

The ITAS is a real-time, multimodal, distributed, plug-and-play command and control system. Design choices were influenced by the need for including the following capabilities: ease of use, multimodal inputs, low latency, true plug-and-play, natural interaction processing, low cost, immunity against obsolescence, distributed intelligence, ease of design, and isolation between the ITAS functions and the interactive display.

The ITAS is intended as a universal interface strategy that requires minimal learning by the user. The ITAS must automatically handle the addition and removal of accessors and ITAPs without requiring intervention from the user.

The ITAS generates output commands by combining different user inputs thereby placing stringent requirements on recognizing the relative timing of when inputs are received.

Latency is the time delay between a user expressing an intention and the target device receiving a command. Commands must be recognized and passed to the output in the minimum possible time.

True plug-and-play capability means being able to add or remove an accessor or an ITAP without disturbing the normal operation of the ITAS. Accessors and ITAPs must not be dependent upon having prior knowledge of other components in the ITAS.

To handle natural interaction processing, there must be flexibility in the way the ITAS does word filtering and combining of the different input channels.

An affordable ITAS provides a practical framework for implementing ubiquitous computing.

To provide immunity against obsolescence, it must be possible to update or replace individual accessors and ITAPs without disturbing normal operation.

Manufacturers of intelligent accessors and ITAPs must be able to develop and test their products independently of other ITAS components (distributed intelligence). New ITAPs, for example, contain knowledge of their intended target device or appliance.

Developers must be able to create new accessors and ITAPs without requiring a detailed understanding of the complete ITAS system.

An important aspect is isolation between the ITAS functions and the physical interactive display. Users can choose screen size and interaction modality without disturbing any ITAS functions.

As depicted in FIG. 1, the ITAS includes three major functional components: (i) an accessor 10 that provides a user interface 15 matched to individual needs, abilities, and preferences; (ii) an Intelligent Total Access Port (ITAP) 20 that handles all of the machine specific data and command interfaces on the target IT device; and (iii) a universal wireless protocol 25 that provides plug and play capabilities by enabling any accessor to connect to any Total Access Port (TAP).

Figure 2:
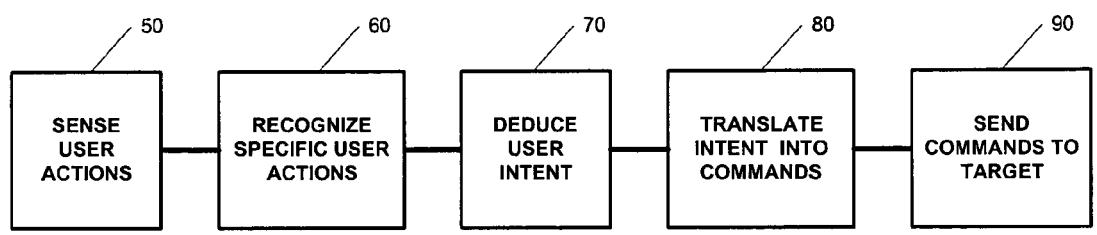
FIG. 2 illustrates the basic operations performed by the ITAS.

The operation of the ITAS can be considered from two different perspectives. From a functional perspective, the ITAS provides a reliable connection between a person 30 and a target IT device 40. From a user interaction perspective, the ITAS interprets human intentions and translates them into commands for a specific target IT device 40. The basic operational steps employed in the ITAS are depicted in FIG. 2. These steps include: sense user actions 50, recognize specific user actions 60, deduce user intent 70, translate intent into commands 80, and send commands to target 90.

Operations at the user interaction level are totally automatic and are independent of the computer platform, operating system, and applications used in the target device.

An accessor translates user activities into commands for an ITAP. Individual accessors may be designed to handle a single input modality or may combine several complementary modalities such as speech recognition and head tracking.

Figure 3:
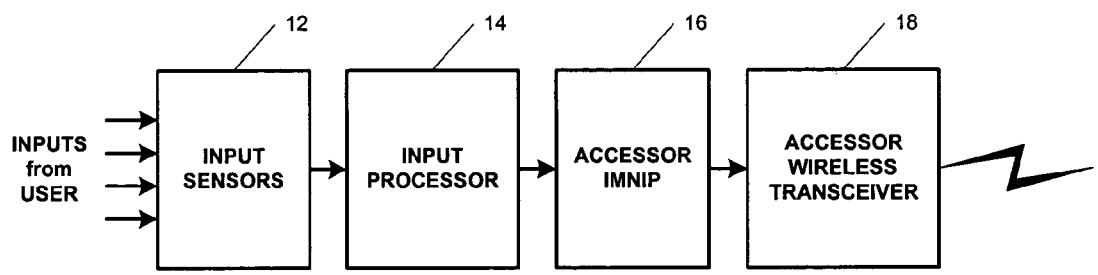
FIG. 3 illustrates the functional components of an accessor.

As depicted in FIG. 3, an accessor includes four major components: (i) input sensors, (ii) an input processor 14, (iii) an accessor IMNIP 16, and (iv) a wireless transceiver 18. The input sensors 12 detect actions of a user. The input processor 14 describes the user actions in a consistent form. The accessor IMNIP 16 determines the intent behind the actions of the user. The wireless transceiver 18 conveys the intent of the user to the device that is to be controlled.

Humans are capable of using multiple modalities for normal communication. An accessor provides a convenient way for incorporating different input-sensing technologies to detect human actions such as typing, speaking or gesturing. Typical input sensors include: keyboard, keypad, switch, mouse, head tracker, eye gaze tracker, microphones, sonar, still camera, movie camera, bio sensors, and electromagnetic field sensors. Accessors may be designed to incorporate any number of input sensors.

While a single input sensor is often sufficient for determining user intent, there are situations in which it is either necessary or more convenient to combine the data received from several input sensors. Satisfying the access needs of individual users while at the same time meeting the product quantity requirements of manufacturers leads to conflicting design requirements. On the one hand, each user wants an accessor containing a combination of access strategies that precisely satisfy his or her needs. On the other hand, manufacturers must achieve a viable scale of production for each product by minimizing the number of design variants they offer. One of the design objectives for accessors, therefore, is to make them sufficiently flexible that they meet the broad range of individual access needs while, at the same time, constraining the range of different accessors that are necessary so that manufacturers can achieve viable production quantities. The ITAS strategy for resolving these conflicting design requirements is described below.

The input processor 14 amplifies and processes input data received from sensors 12 to transform electrical signals into human language descriptions of the current actions of the user. Typing and speech recognition, for example, automatically generate words. Other input modalities, however, may need to be processed to generate word-based descriptions, such as a pointing device naming the object that is pointed to instead of an x,y,z direction vector.

The operation of an IMNIP (Integration Manager and Natural Interaction Processor) is described in more detail below. Its most significant purpose, however, is to enable people to control IT devices using their own words and gestures to express their intentions. The IMNIP 16 performs three essential functions: (i) it merges multiple streams of incoming text; (ii) it filters out all of the incoming words that are meaningless to the ITAPs with which it is currently able to communicate; and (iii) it extracts user intent from the stream of filtered text. The IMNIP 16 can decode commands consisting of single words, phrases with words in any order, and phrases in which words must be received in a defined order. Outputs from the IMNIP 16 can be either words or phrases that are meaningful to an attached ITAP, or command codes for controlling settings and operation of the accessor. Outputs from the IMNIP 16 can specify either single commands or groups of commands to be executed sequentially (macros).

The accessor wireless transceiver 18 provides bi-directional streaming data communications between an accessor 10 and one or more ITAPs 20. Operation of the wireless system is fully automatic and is invisible to the user. Natural language messages are used between accessors 10 and ITAPs 20. In the simplest configuration, the wireless transceiver 18 connects a single accessor 10 to a single ITAP 20. A more typical configuration, however, will have single person multiple accessors or multiple people, each using one or more accessors and working together collaboratively such as students working in groups in a classroom, and groups of students working collaboratively with other groups. For example, a speech recognition accessor can be used to enter text and spoken commands, and a head tracking accessor can be used to move the mouse cursor.

An ITAP 20 translates between the ITAS protocol and the proprietary protocol required by a target system. Wherever possible, the ITAPs emulate standard input devices such as a keyboard, keypad, mouse or joystick. ITAPs currently exist for interfacing to the PS2 (mouse) and USB ports on a PC, to infrared inputs on audiovisual equipment and the X10 modules that are used to control appliances in the home. In situations where there is no clearly defined standard, an ITAP 20 can be configured to emulate the actual buttons, switches, and pointing controls included in an actual device.

Figure 4:
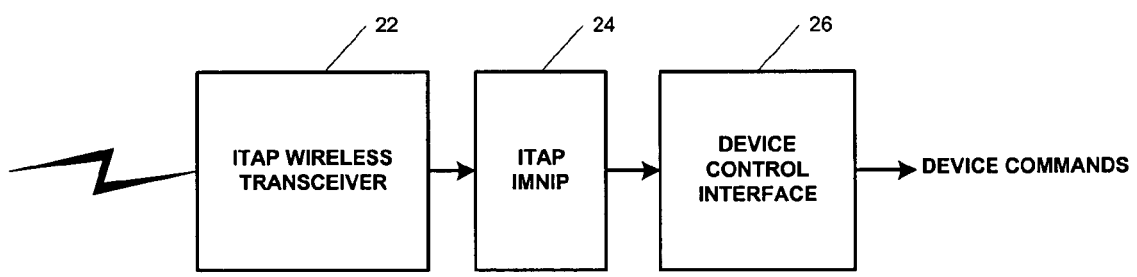
FIG. 4 illustrates the functional components of an ITAP.

As depicted in FIG. 4, an ITAP 20 includes three major components. (i) a wireless transceiver 22, (ii) an IMNIP 24, and (iii) a device control interface 26. The ITAP wireless transceiver 22 receives messages from accessors 10 that are intended for the IT device 40 to which the ITAP 20 is connected. The ITAP IMNIP 24 determines the intent contained in messages received from one or more accessors. The device control interface translates ITAS commands into proprietary protocol required by the IT device 40 to which the ITAP 20 is connected.

The ITAP wireless transceiver 22 provides bi-directional streaming data communications between an ITAP 20 and one or more accessors 10. Operation of the wireless system is fully automatic and is invisible to the user. Natural language messages are used between accessors 10 and ITAPs 20. In the simplest configuration, the ITAP wireless transceiver 22 will connect a single accessor 10 to a single ITAP 20. It will be more typical, however, for multiple accessors and ITAPs to be linked into a single ITAS network. In a more typical configuration, an ITAP will be linked to multiple accessors to form a network in which a user may use several accessors in a collaborative manner. For example, a speech recognition accessor can be used to enter text and spoken commands, and a head tracking accessor can be used to move the mouse cursor.

The ITAP wireless transceiver 22 is also able to communicate with other ITAPs to establish addresses and priorities whenever an accessor 10 or ITAP 20 joins or leaves the particular ITAS network. Whenever more than one ITAP is present in a network, the ITAP with the lowest physical address is configured as the master that coordinates communications between accessors and ITAPs and maintains a timestamp clock that is used as the timing reference by all of the ITAPs and accessors. If present, a shared resource ITAP will have the lowest address and therefore will be the master or Node Coordinator of the ZigBee wireless network. If not present, the ITAP with the next highest address will be the master.

The operation of an IMNIP is described in more detail below. When used in an ITAP, the IMNIP 24 performs three essential functions: (i) it merges incoming text messages from multiple accessors; (ii) it filters out incoming words that are meaningless to the IT device to which it is connected; and (iii) it translates natural language commands into the specific control codes required by the IT device. The IMNIP 24 can decode text commands including single words, phrases with words in any order, and phrases in which words must be received in a defined order. Outputs from the ITAP IMNIP 24 are either single commands, or macros consisting of a sequence of commands.

IT device manufacturers usually adhere to industry standards such as Universal Serial Bus (USB) for user interface ports. It is not uncommon, however, to find products that use either modified versions of a standard protocol, or proprietary protocols that are not based on any external standard. The device control interface 26 translates between the ITAS protocol used for communication between accessors 10 and ITAPs 24, and the protocol that the IT device 40 uses. The ITAP 20 presents a standard interface to the accessors while emulating the real interface devices used by the particular IT equipment.

There is a basic conflict between the needs of individual users and manufacturers. The user needs are matched to his or her input or output needs whereas manufacturers want each accessor produced to satisfy the needs of a large number of users. ITAS provides a unique resolution of these conflicting requirements.

Where it makes practical and economic sense to do so, popular input strategies such as speech recognition and head tracking may be combined in a single accessor 10. Specialized input strategies, such as eye gaze trackers or biosensors, may be implemented in a single-function accessor. All accessors have one or more cascading inputs for receiving the output of another accessor, as shown in FIG. 5.

Figure 5:
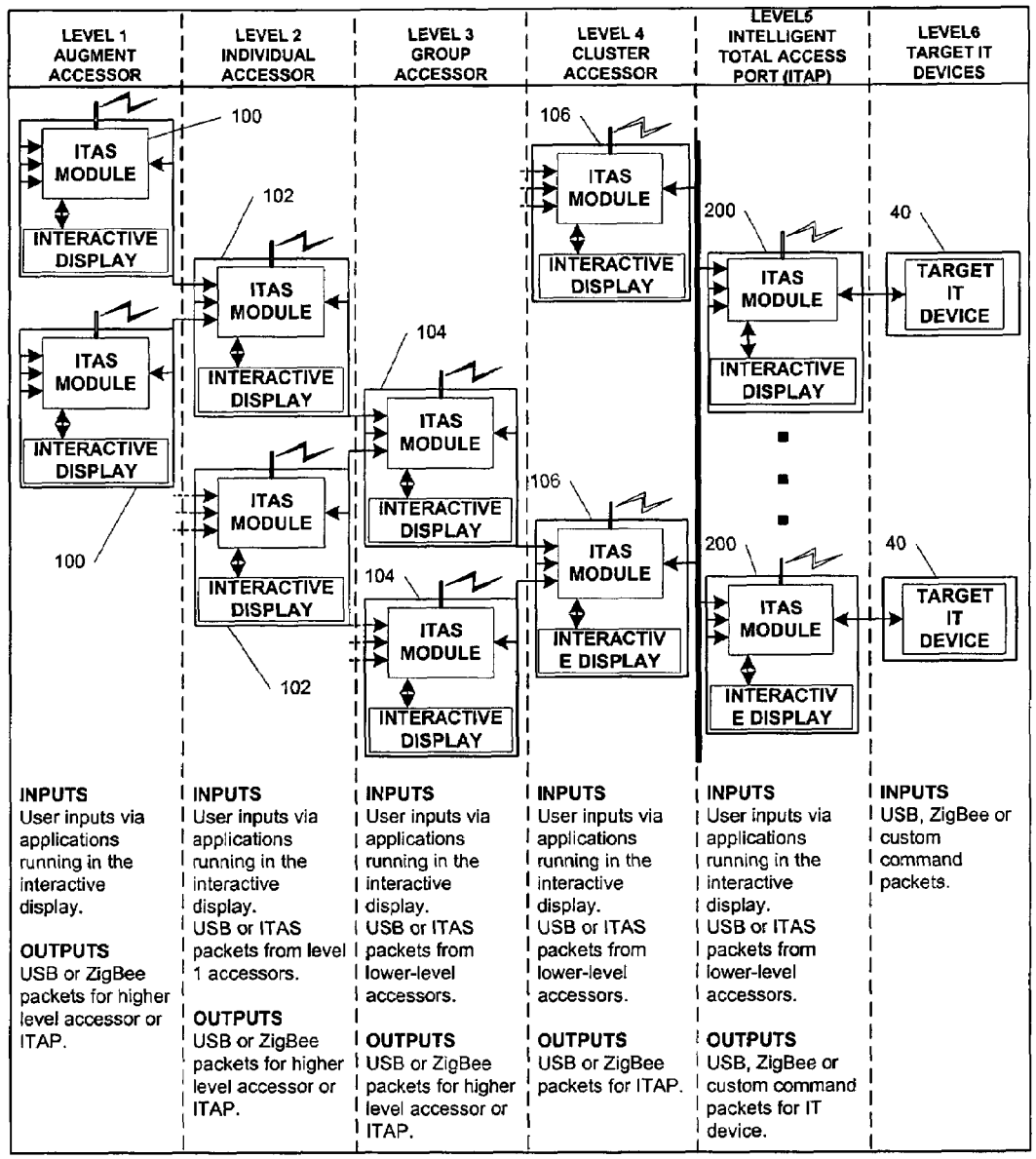
FIG. 5 illustrates an embodiment having cascaded accessors.

The exemplary accessor configuration shown in FIG. 5 provides three major advantages over other possible configurations. A first advantage is that accessors can be combined in any order to achieve the interaction capabilities required by the user. A second advantage is that it provides a great deal of flexibility in how the word filtering functions are performed by the IMNIPs. A third advantage is that the intelligence of the ITAS is distributed across all of the devices without the need for a central coordinating device. Each accessor is responsible for deducing the overall intent from its own inputs and all messages received from accessors connected to its cascading inputs. The following paragraphs show how accessors and ITAPs may be combined to handle simple situations such as one person 30 using a single accessor 10 to control an IT device 40 through a single ITAP 20, to complex systems involving many users with multiple accessors controlling many different IT devices through multiple ITAPs.

FIG. 5 further shows how the output commands generated by accessors are combined by connecting them to "cascading" inputs of higher-level accessors 100, 102, 104, 106. The purpose of the cascading input is twofold: (i) it provides a structure for assembling accessors into groups and clusters; and (ii) it allows different word filtering to be applied to different user input modalities. For example, a spoken command from a speech recognition accessor, such as "please turn that on," is insufficient to generate a meaningful command. If it is combined with the output of a pointing accessor, however, that identifies a particular object, such as a lamp, there is now sufficient information to generate a meaningful command for an ITAP. The outputs of the accessors are fed into the cascading inputs of a third accessor, which contains the IMNIP that combines and filters the incoming message to generate the command. While not shown in FIG. 5, messages from any accessor 100, 102, 104, 106 may also be sent directly to any ITAP, bypassing any intermediate accessor.

The function performed by a particular accessor is classified by the level at which the accessor is connected.

| (i) | Level 1 | Augmenting Accessors 100 - provide specialized input capabilities such as speech recognition or head tracking for individual users. |
|---|---|---|

-continued

| | | |
|---|---|---|
| (ii) | Level 2 | Individual Accessors 102 - provide basic capabilities for individual access, typically a tablet or handheld device equipped with a touch screen. |
| (iii) | Level 3 | Group Accessors 104 - provides shared resources, such as pointers or keyboards, that can be used by any member of a group. Also merges the outputs from multiple individual accessors. |
| (iv) | Level 4 | Cluster Accessors 106 - merges the outputs from multiple group accessors and communicates directly with ITAPs. |
| (v) | Level 5 | Intelligent Total Access Ports (ITAPs) 200 - merges commands from multiple accessors and generates command codes for specific IT devices and appliances. |
| (v) | Level 6 | Target Devices 40 - target devices include computers, all types of IT appliances, and any electrically controlled device. |

Figure 6:
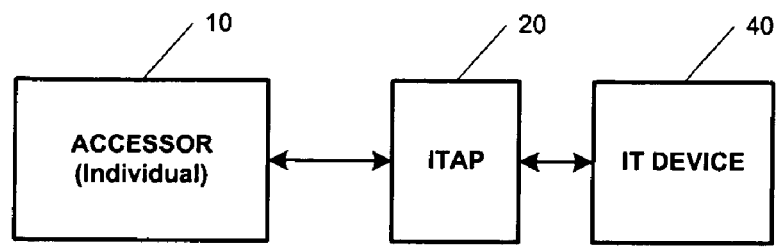
FIG. 6 illustrates an embodiment having an individual accessor with an ITAP.

For consistency in the addressing scheme used by the ITAS, ITAPs 200 are designated as level 5. It is not necessary, however, for accessors to be present at all levels in a particular installation. For example, a system that is only used by one person to access one target device 40 could consist of a single "individual" accessor 10 and a single ITAP 20 as depicted in FIG. 6. In this case only level 2 and level 5 are populated and the other levels are skipped. Should the user ever need to use another input modality, such as a speech recognizer, this can be added at level 1 without disturbing the rest of the system. Similarly, if another person needs to share the target device 40, this can be achieved without disturbing any other parts of the system by adding a group accessor 104 at level 3.

There are some situations in which accessors 10 connect to the target device 40 without an ITAP 20. This forgoes command translation and macro functions normally provided by an ITAP, but still provides basic keyboard and mouse functions. For example, a speech accessor can be connected directly to the USB port of a PC for entry of text and spoken commands.

Figure 8:
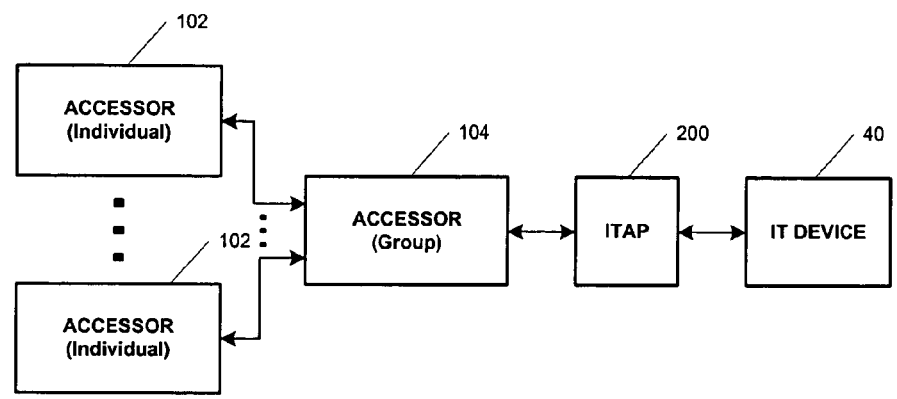
FIG. 8 illustrates an embodiment having group and individual accessors with an ITAP.

When a new accessor is introduced to an existing ITAS, it can only bond to accessors that are at a higher level. The accessor can only bond to one other higher-level accessor at a time. The user must make a selection when there are multiple accessors at the next higher level. It is possible to leave out one or more levels if there is no reason to include them. The example shown in FIG. 6, for example, leaves out levels 3 and 4 since there is no need for group 104 or cluster accessors 106 when there is only one user. In FIG. 8, however, a group accessor 104 is included at level 3 to merge two individual accessors 102.

After it has been physically bonded to an accessor at a higher level, it is still possible for an accessor to bypass one or more levels by setting bypass flags in the header of any data packet. An augmenting accessor 100, for instance, can send data packets directly to an ITAP 200 by setting the bypass flags for levels 2, 3 and 4. There are two reasons for bypassing higher-level accessors. The first reason is that the packet contains information that is not to be interpreted by the IMNIPs in the bypassed levels. This enables an individual accessor, for instance, to alternate between sending control-packets to a group accessor 104 or to the target device 40. The second reason is that the packet contains streaming data that is already in the correct format for the next level that is not bypassed. An augmenting accessor 100 that produces standard mouse codes, for example, could control the cursor on an individual accessor 102, a group accessor 104 or the target device 40 simply by setting the appropriate bypass flags.

FIG. 6 shows an individual accessor 10 controlling a single ITAP 20. This is the simplest ITAS configuration that can be used. The accessor 10 may have only one input modality, such as speech recognition, or it may have several complementary modalities such as speech recognition for text and command inputs and head tracking to perform mouse functions. Wherever possible, users will prefer to have a single accessor that contains all of the modalities they require. This will depend on manufacturers identifying combinations of input and output modalities that will be sufficiently widely used to make them viable as stand-alone products. To handle situations where users have out-of-the-ordinary requirements, all accessors include one or more cascading inputs that can accept output messages produced by other accessors.

Figure 7:
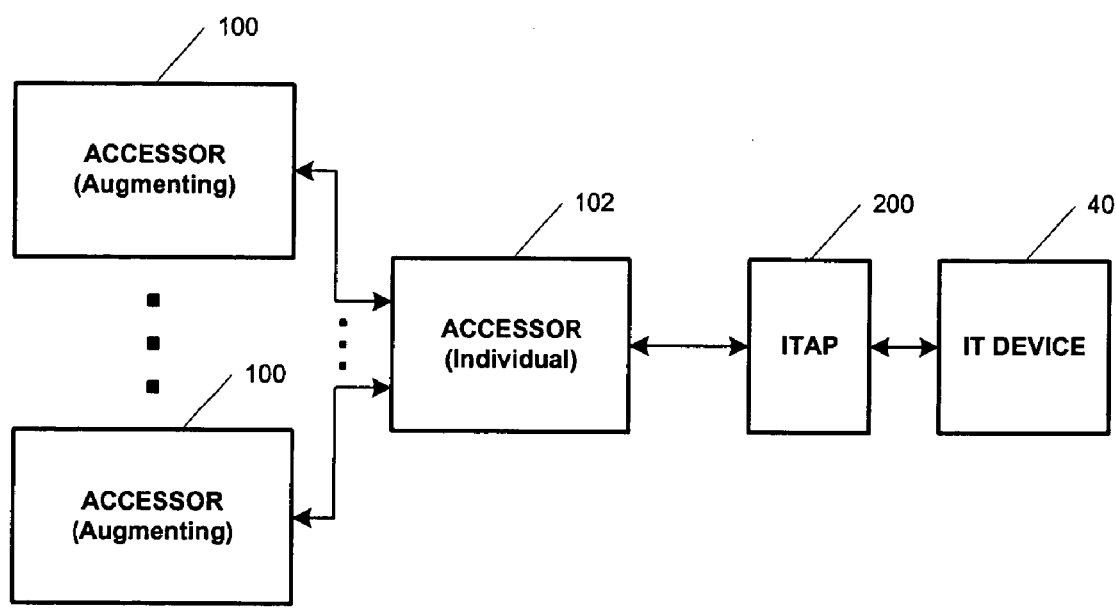
FIG. 7 illustrates an embodiment having augmenting accessors and an individual accessor with an ITAP.

The primary function of an augmenting accessor 100 is to add special or customized interaction modalities to individual accessors 102. This strategy makes it viable for larger manufacturers to focus on high volume production of popular accessors that meet a broad range of user needs while also allowing smaller manufacturers to focus on low volume or custom production of specialized accessors that satisfy a narrow or range of needs. It also provides a convenient way for researchers to evaluate new input or output strategies before investing in the design of a full accessor. An augmenting accessor 100 may or may not include an IMNIP. FIG. 7 illustrates an embodiment having augmenting accessors 100 and an individual accessor 102 with an ITAP 200.

A group accessor 104 is used to combine the outputs of multiple individual accessors in situations where there is either one person using several individual accessors collaboratively to control one or more ITAPs or, if there are several people, each using an individual accessor to control one or more ITAPs. Multiple accessors can be arranged as a single group. In conference room, meetings, or classroom situations, a group accessor 104 gives participants access to shared tools such as remote keyboards and pointing devices as well as integrating any individual accessors 102 they may have. FIG. 8 illustrates an embodiment having group 104 and individual accessors 102 with an ITAP 200.

Figure 9:
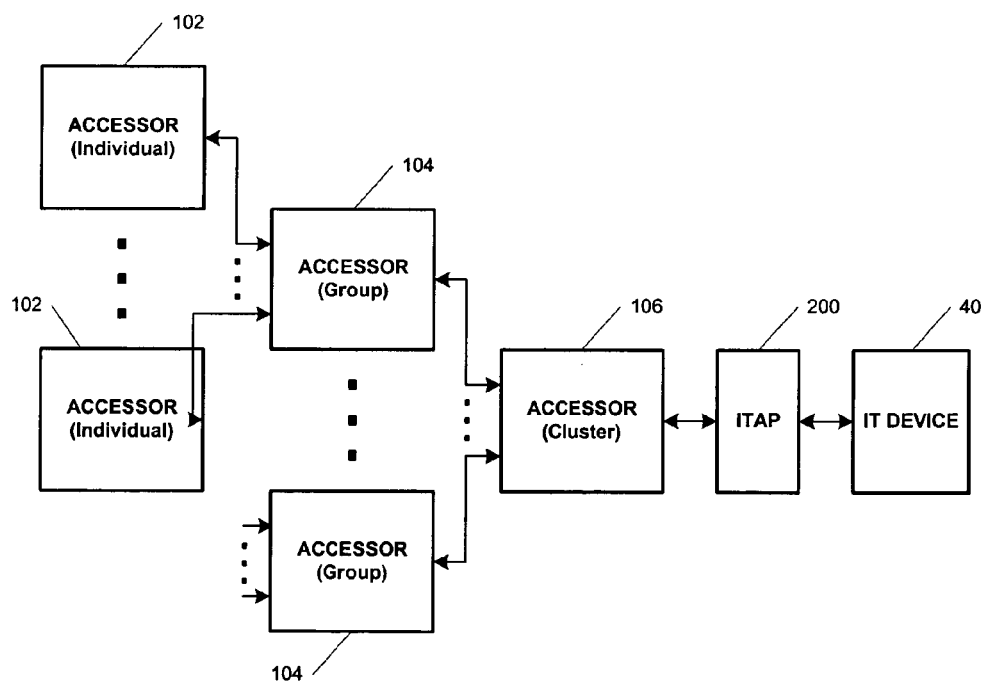
FIG. 9 illustrates an embodiment having cluster, group and individual accessors with an ITAP.

In situations where a large number of people may be using accessors, such as in a large lecture hall, at a conference, or in a museum, there may be many groups of accessors 104 that are formed into one or more clusters. A cluster accessor 106 has cascading inputs for merging groups of accessors 104 but it does not necessarily have its own user inputs. FIG. 9 illustrates an exemplary embodiment.

Figure 10:
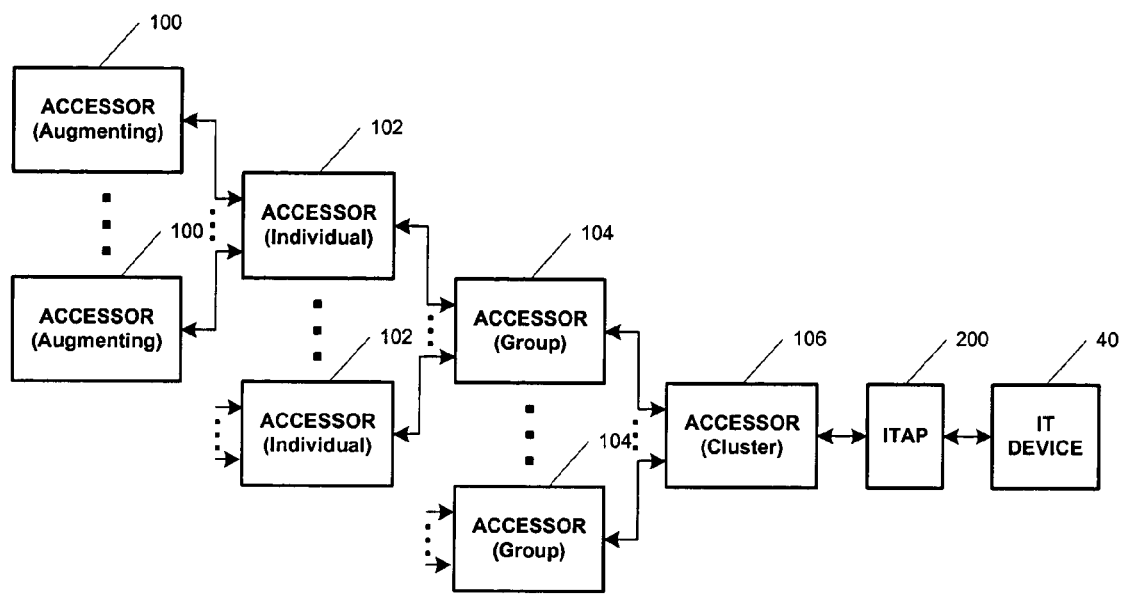
FIG. 10 illustrates an embodiment having cluster, group, individual, and augmenting accessors with an ITAP.

FIG. 10 shows the relationships and hierarchical organization for a full complement of accessors 100, 102, 104, 106. A four-byte addressing scheme accommodates up to 255 accessors at each of the four levels. An address of zero at any level signifies the absence of any accessors at that level. The cluster accessor 106 is represented by the most significant byte and the augmenting accessor 100 is represented by the least significant byte.

Four different ITAP configurations are described in the following paragraphs. These are wireless ITAP, networked ITAPs, multiple target ITAPs, and a shared resource ITAP.

Figure 11:
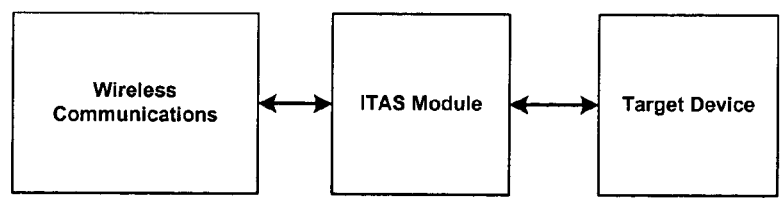
FIG. 11 illustrates an embodiment having a single wireless communications system and a single ITAP.

FIG. 11 shows the normal ITAP configuration in which a single wireless ITAP is provided for each target device. Each ITAP is assigned an identity code during manufacture that specifies the class of ITAP and the intended class of target device. Multiple wireless ITAPs can operate in parallel using the same accessors. A house ITAP and a PC ITAP, for example, can be operated side by side from the same accessor.

Figure 12:
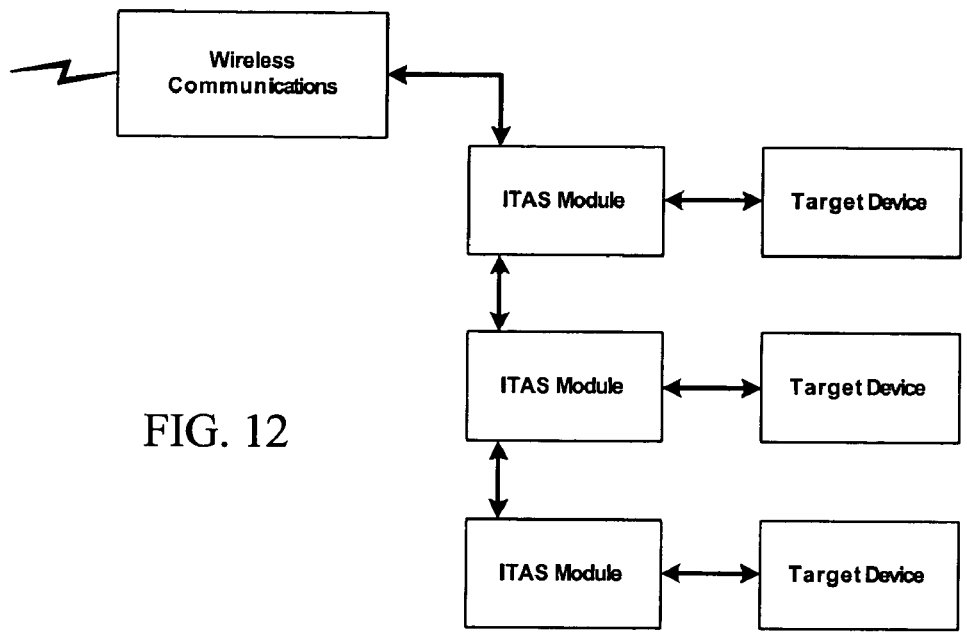
FIG. 12 illustrates an embodiment having a single wireless communication system and multiple ITAPs.

There are situations in which it is more cost effective to use a single wireless communications system with several networked ITAPs, as depicted in FIG. 12. This not only conserves radio bandwidth when there are many devices in close proximity, but also enables device designers to more closely integrate the operation of installations such as audio/visual entertainment systems.

Figure 13:
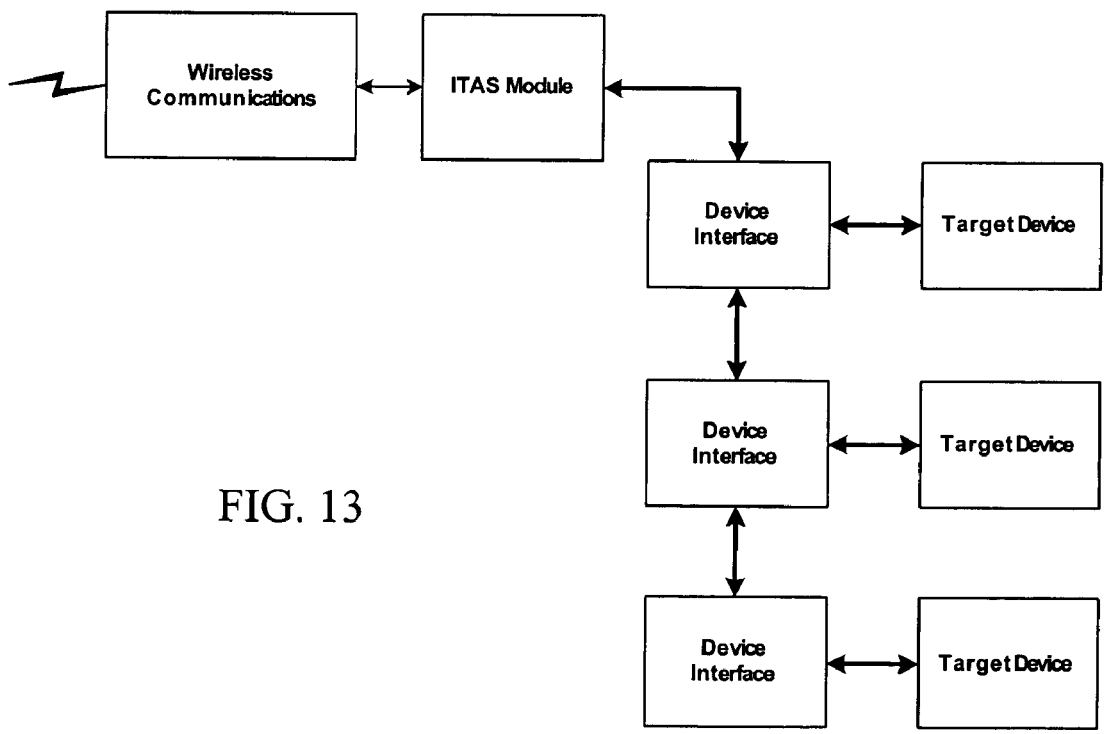
FIG. 13 illustrates an embodiment having a single wireless communication system and single ITAP with multiple target devices.

The multiple target ITAP depicted in FIG. 13 provides a cost-effective strategy for using a single IMNIP to control a large number of similar target devices. One version of the house ITAP, for example, provides infrared (IR) control of audiovisual (AV) equipment, X10 control of lamps and direct control of doors and windows.

Figure 14:
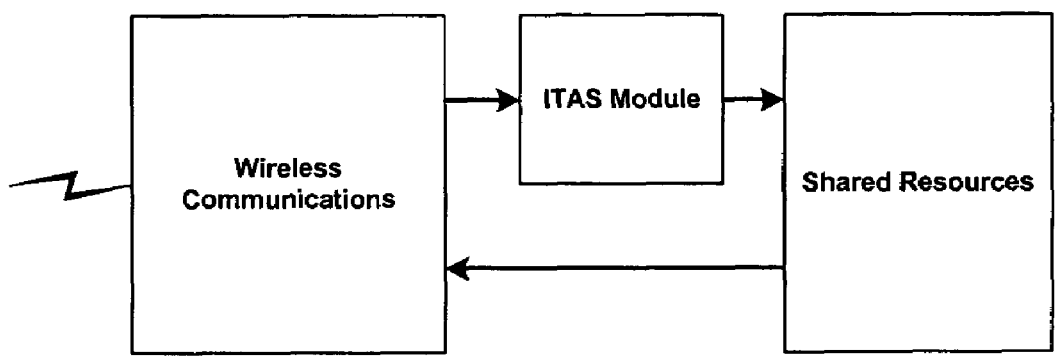
FIG. 14 illustrates an embodiment having a shared resource ITAP.

A shared resource ITAP depicted in FIG. 14, does not control target devices directly. Instead, it provides shared functions such as providing feedback to users; collecting and storing information about the accessors and ITAPs on the system; collecting, storing and displaying system status; and providing a common access point to a local or wide area network, or the Internet.

Physical Components of the ITAS

An ITAS installation includes a collection of accessors and ITAPs arranged as a hierarchical tree. Between two and six levels may be cascaded to provide the flexibility to accommodate many users and many target devices. More levels may be used in special circumstances, such as when there are many users with very different access requirements, accessing many different types of target devices.

Figure 15:
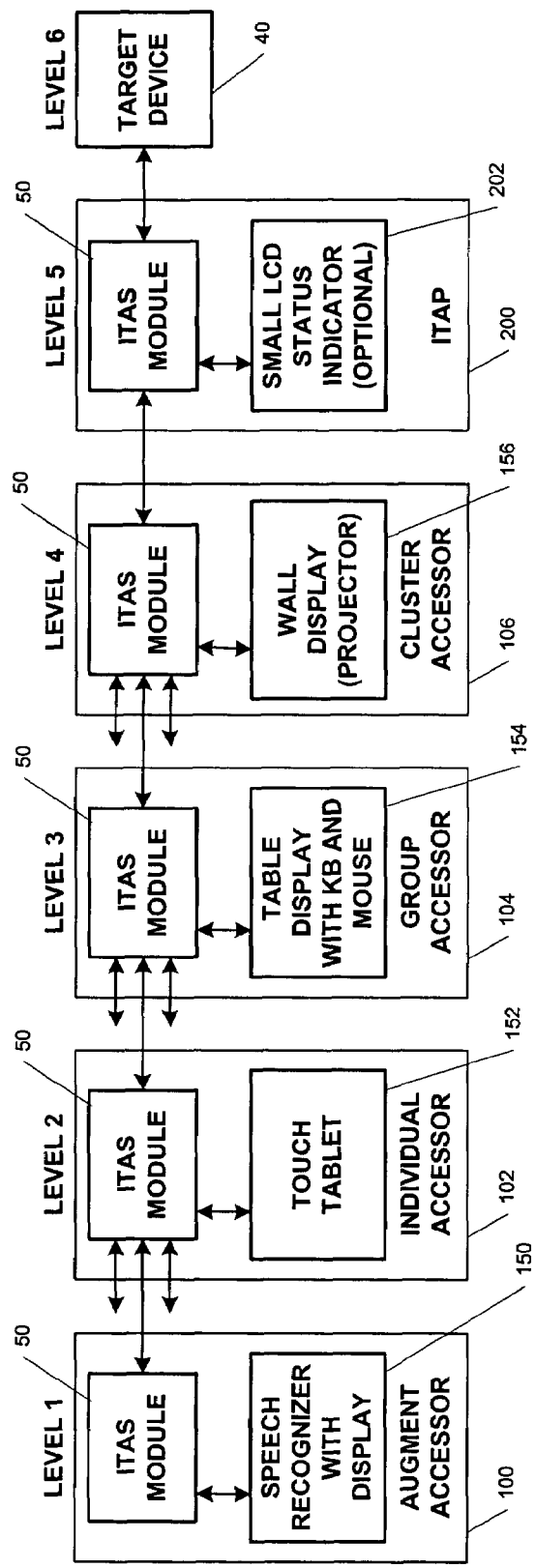
FIG. 15 illustrates an embodiment having cascaded ITAS modules with different interactive displays.

FIG. 15 shows how the ITAS architecture is implemented using identical ITAS modules 50 and appropriate interactive displays 150, 152, 154, 156, 202. The ITAS modules 50 perform all of the communications functions, merging of multiple accessors, natural interaction processing and command generation. Different interactive displays are used at each level, depending on the type of interaction supported at that level. The number of levels in any particular installation depends on the number of individual users and how they are divided into groups and clusters. The simplest configuration would be a single augment 100 or individual accessor 102 controlling a target device 40 such as a PC that has a USB or ZigBee interface.

Figure 16:
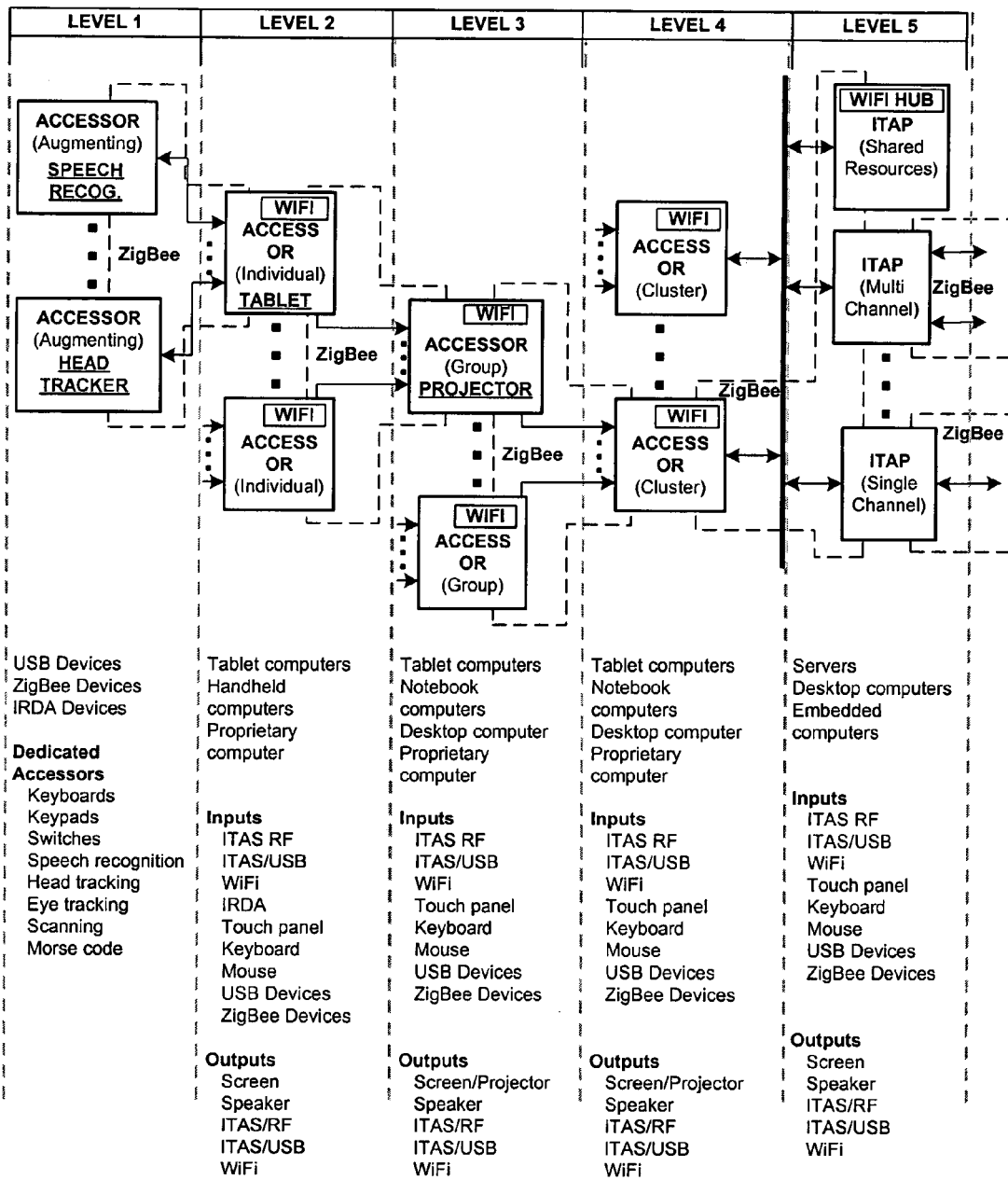
FIG. 16 illustrates the physical components of the ITAS of the present invention.
Figure 17:
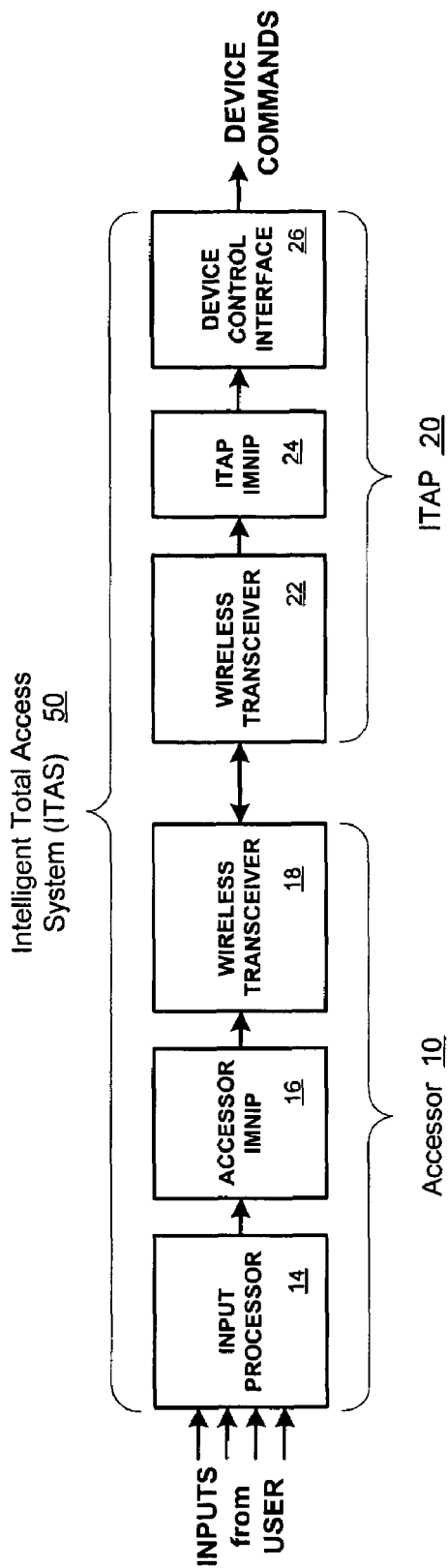
FIG. 17 illustrates an embodiment having an ITAS with two IMNIPs.

FIG. 16 shows a typical hardware implementation of the interactive displays that can be used at each level.

Integration Manager and Natural Interaction Processor (IMNIP)

This section describes a technique for implementing an Integration Manager and Natural Interaction Processor. An IMNIP can be implemented in conventional desktop and notebook computers or embedded within small microprocessor-based control devices. While specifically designed for the Intelligent Total Access System (ITAS), the IMNIP can be used in any situation requiring a person to command and control a computer-based device. The IMNIP operates independently of the input modality and is able to integrate inputs from multiple sources such as keyboards, speech recognizers, touch panels, Morse code and gestures. The strategies developed for the IMNIP provide significant advantages over earlier agent based NIP designs, as follows:

1. the prototype IMNIP merges and decodes up to four input message streams (this can be generalized to support any number of message streams);
2. individual characters are parsed as they are received thereby eliminating the need to buffer strings of input data;
3. pointers into tables and arrays drive all operations in the IMNIP, thus eliminating string manipulations and providing instantaneous translation from an input command to an output event;
4. the IMNIP can be implemented equally well on large computers and small embedded microprocessors;
5. the IMNIP design is scaleable and can support any size corpus of command words;
6. the IMNIP can simultaneously parse multiple word lists;
7. the IMNIP decodes single word commands, multiword commands, macro commands and embedded multiword device names;
8. the IMNIP filters out unwanted words that precede or follow a macro or are embedded within a macro;
9. the IMNIP can separate and act upon macros and parameters contained within a single message;
10. there is no mode switching between macros and isolated words;
11. the IMNIP enables simple devices to communicate efficiently using natural text messages;
12. the IMNIP makes "Intention Driven Technology" feasible and practical; and
13. the system can support multiple languages.

The IMNIP performs all of the message merging and decoding functions for the ITAS. One embodiment of the ITAS system 50 is shown in FIG. 15. While this shows a single accessor 10 feeding a single ITAP 20, the ITAS 50 is designed to simultaneously support multiple accessors and multiple ITAPs. In some cases, a single ITAP, such as the house ITAP, can also control multiple target devices.

The ITAS 50 uses two slightly different implementations of the IMNIP 16. An accessor IMNIP 24 that combines and extracts intent from multiple streams of input from a user, and an ITAP IMNIP that merges natural text messages received from multiple accessors and generates the device commands required to perform the intended operation.

Figure 18:
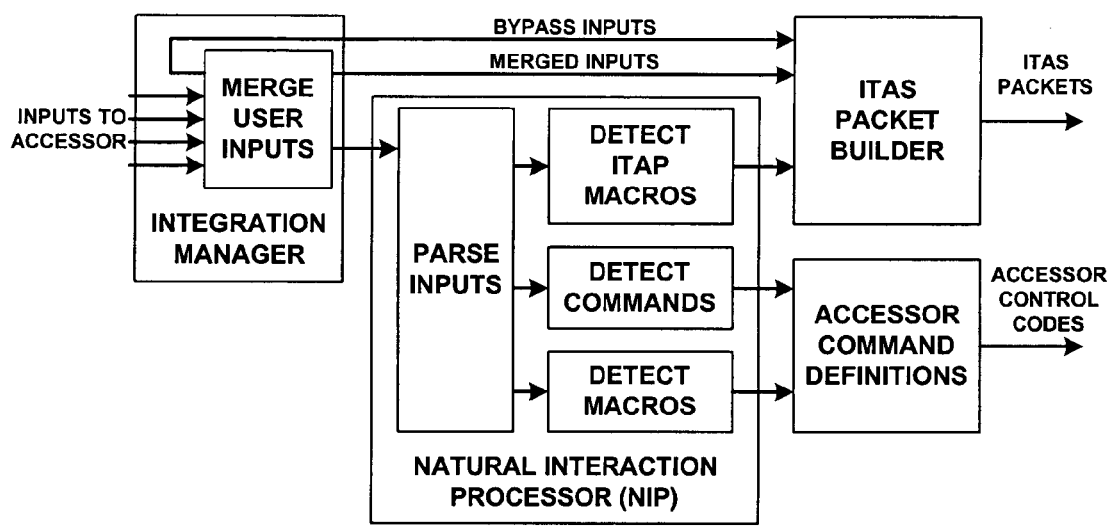
FIG. 18 illustrates functions performed by an accessor IMNIP.

An accessor IMNIP 16, as depicted in FIG. 18, performs six essential functions: (i) it merges user inputs received from multiple input devices or sensors; (ii) it reduces the variety of words contained in user-generated commands by replacing synonyms with words contained in the ITAS corpus and eliminating words that do not fit the current context; (iii) it detects commands and macros that enable the user to control the accessor; (iv) it detects words and phrases that are to be passed directly to the output of the accessor for processing at a later stage; (v) it recognizes streaming data, such as mouse-control packets, and passes it through without modification; and (vi) it recognizes ITAP macros that control multiple target devices and generates separate commands and macros for each of the target devices. An accessor IMNIP 16 can filter out "noise" words and pass all other words forward for resolution in a later IMNIP.

Figure 19:
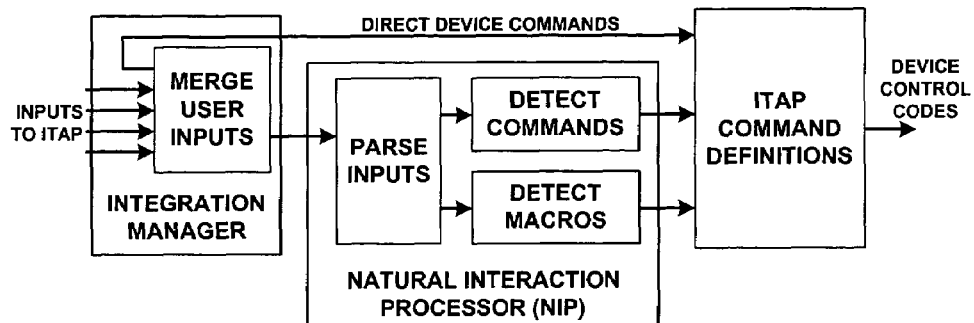
FIG. 19 illustrates functions performed by an ITAP IMNIP.

An ITAP IMNIP 24, as depicted in FIG. 19, performs five essential functions: (i) it recognizes the natural text name of the ITAP; (ii) it merges natural language command messages received from one or more accessors; (iii) it recognizes single word and multiword natural language commands and translates them into the necessary device control codes; (iv) it recognizes streaming device commands, such as mouse-control packets, and passes them through without modification; and (v) it recognizes multiword macros and translates them into the necessary device control code words.

It is important to distinguish between a multiword command and a macro. The words in a multiword command can be received in any order. The words in a macro must be received in a defined order with no other words attached before or after the macro. Macros are used for performing critical functions on the target system.

As depicted in FIG. 19, one way of explaining the operation of the IMNIP is to think of it as a word filter, that extracts predefined keywords and macros from messages that are received from the user. This type of word filter is necessary since a device designer has no control over the words that may be chosen by a user to express an intended action. The designer does have full control, however, over the choice of words used to specify each function a target device is able to perform. The traditional solution to this problem is to force the user to learn scripts containing the exact words and phrases that have been predefined for each command on each device. Fundamental flaws with this traditional solution include the following: (i) interaction is not intuitive; and (ii) every command requires a separate script; (iii) there is a steep learning curve for complex devices; (iv) people are reluctant to learn scripts and they forget them when under pressure; (v) it is difficult to combine multiple input modalities; and (vi) scripts that initiate an operation must be entered separately from scripts that provide parameters.

The IMNIP overcomes these problems by allowing a user to describe an intended outcome in his or her own words as if asking another person to perform the action. Whenever an IMNIP recognizes an intended action, it instructs the system to perform all of the necessary steps without requiring the user to participate in their execution or to even know what the steps are.

While a single IMNIP can perform all of the necessary merging and decoding operations for a particular combination of user inputs and output devices this results in very specialized and inflexible system. It is much more versatile when the IMNIP functions are distributed between the accessor which handles the human-centered functions and the ITAP which handles the machine-centered functions. A serial, or cascaded configuration of the IMNIPs enables systems to handle ad hoc combinations of users and target devices with minimum overhead. The first IMNIP handles user dependent details independently of the device requirements and the second IMNIP handles device specific details independently of the human factors. Parallel operation of IMNIPs, as depicted by the four accessors or the four ITAPs in FIG. 20, adds another level of flexibility by allowing different processing and different constraints to be independently applied to each of the input and output channels. The ability for the IMNIP 240 in each ITAP to combine multiple accessor messages allows accessors to be used in collaborative modes without the need for channeling all of the information through a single central processor. The first IMNIP 160 translates intuitive user messages into a compact, well-defined intermediate format that can be efficiently and unambiguously decoded by a second IMNIP 240 to generate the control codes 300 required by a particular device.

Figure 20:
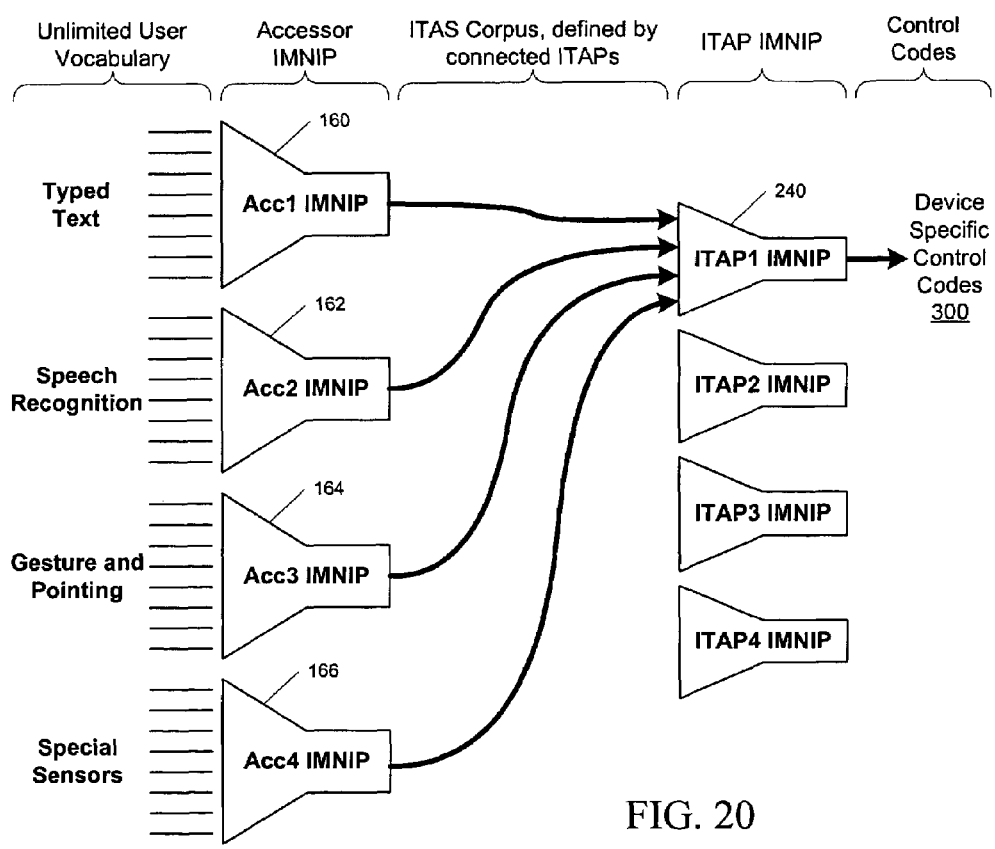
FIG. 20 illustrates word filtering performed by IMNIPs.

As further depicted in FIG. 20, a user can generate any input word or phrase either directly, such as by typing or talking to a speech recognizer, or indirectly such as by touching the image of an object on a touch screen tablet that generates a text message. After passing each input though an accessor IMNIP 160, 162, 164, 166, only words or synonyms that are included in the ITAS corpus will survive. Filtered messages from multiple accessors can be directed to a single ITAP in which the IMNIP 240 will integrate the messages into a single stream, extract command words, parameters, and macros, and generate the stream of output control codes 300 necessary to achieve the intended outcome.

Figure 21:
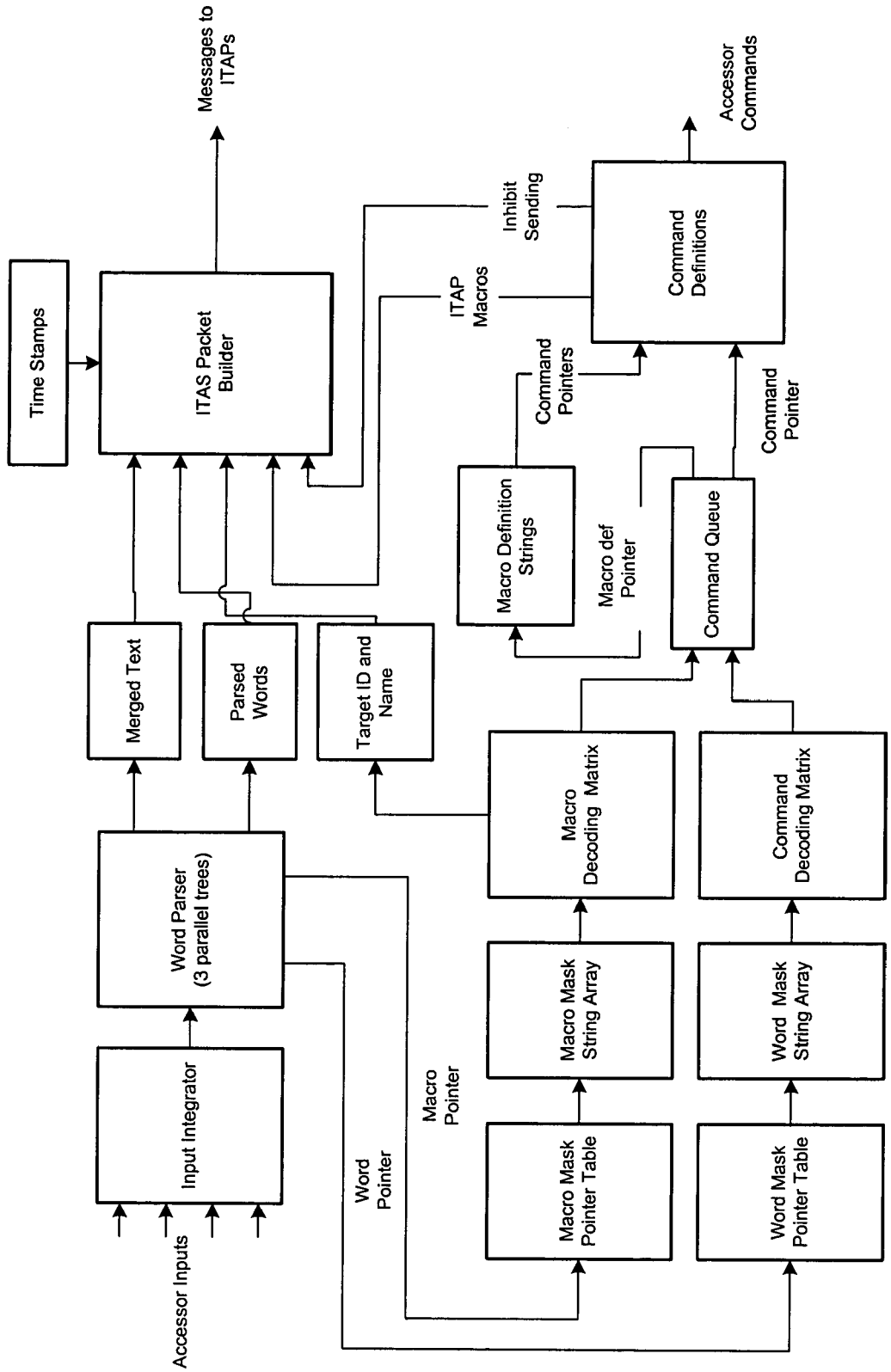
FIG. 21 illustrates a block schematic of an accessor IMNIP.

The accessor IMNIP 16, as depicted in FIG. 21, must not only handle unlimited user inputs that may contain many synonyms, it must also handle a wide range of ITAPs, some of which may never have been encountered before. This flexibility is achieved by providing three parsing trees that are traversed in parallel. The first is an application tree containing a predefined application-specific corpus (ITAS, in this case) that provides a vocabulary for performing all of the normal ITAS functions. It includes words that are commonly recognized by all ITAPs, and all commonly encountered synonyms. Synonyms are translated into their corresponding base word to reduce the range of words sent to the ITAPs. The second is a personal tree containing user-specific words and macros, and extensions to the corpus provided by ITAPs that are permanently available to the user. The third is a temporary extension tree containing word and macro extensions to the corpus that are added on the fly whenever the system interacts with a new ITAP. The temporary extension tree is usually discarded at the end of each session but the user may opt to transfer its contents to the personal tree if the ITAP is to be used frequently. Distributing the corpus in this way over three trees minimizes the amount of processing required to maintain the integrity of the permanent corpus while providing the flexibility to personalize the corpus within each accessor and to extend the corpus at any time.

The following table shows the relationships between inputs and outputs that can be generated by an accessor IMNIP.

TABLE 1

| INPUTS | OUTPUT GENERATED |
| --- | --- |
| Individual characters that are not recognized as part of a supported command or macro | Packets containing individual characters that are sent to an addressed ITAP |
| Individual words that are not recognized as part of a supported command or macro | Packets containing individual words that are sent to an addressed ITAP |
| Individual words that are recognized as parts of commands | Command packets that will be recognized by the IMNIP in one or more addressed ITAPs |
| Individual words that are recognized as parts of an accessor macro. | Single or multiple commands for controlling the accessor. e.g., "dictate mode," command mode," etc. |
| An accessor macro may generate commands for the accessor itself, commands for one or more ITAPs, or ITAP macros for one or more ITAPs | Single or multiple commands for one or more ITAPs Single or multiple ITAP macros for one or more ITAPs |
| Individual words that represent numerical values | Zero-nineteen → add value Hundred, thousand, etc → multiply by value |
| Individual words that are to be excluded from the messages produced by the accessor | No output is produced by the accessor |
| Individual words that negate the rest of a message e.g. "Don't turn on the TV | No output is produced by the accessor |

Figure 22:
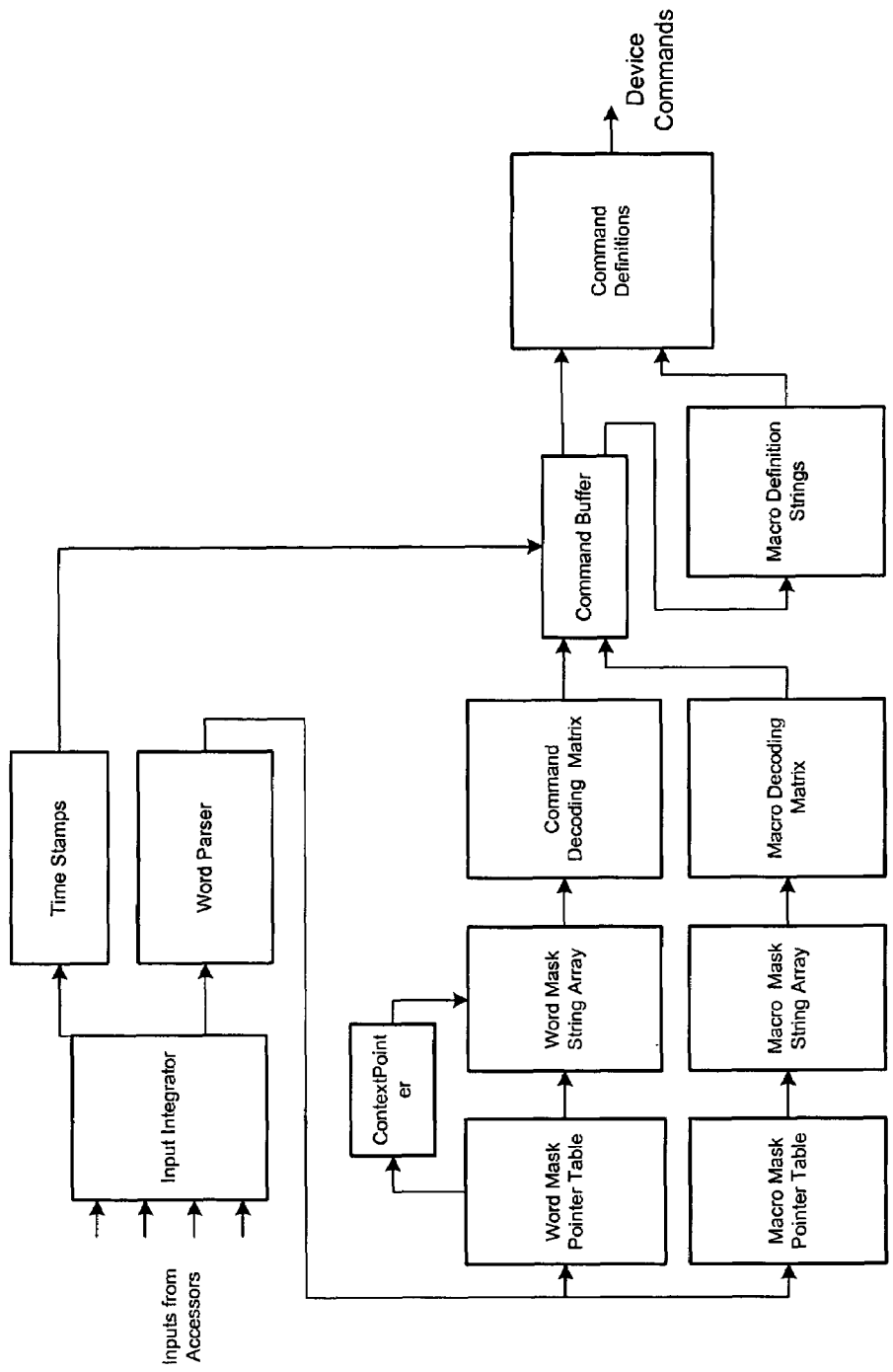
FIG. 22 illustrates a block schematic of an ITAP IMNIP.

The ITAP IMNIP 24, as depicted in FIG. 22, must handle simultaneous inputs from multiple accessors. The corpus of words recognized by the ITAP is defined by the words required to describe all of the output commands and macro phrases that are applicable to the device that is being controlled.

Accessors and ITAPs can be matched to the level of complexity that is to be handled. Any level of accessor can operate with any level of ITAP. Not all capabilities will be available in all cases. Table 2 provides characteristics of different levels of accessors and ITAPs.

TABLE 2

| ACCESSOR | ITAP |
|---|---|
| Small Accessor | Small ITAP |
| Small, portable, low power, embedded processor | Intelligent interfaces for small appliances and lamps |
| Switch accessor | PC interfaces with minimal macro support |
| Morse Code accessor | |
| Motion sensing accessor | |
| Mid-Level Accessor | Standard ITAP |
| Portable device such as hand-held or notebook computers or high performance embedded processors | House ITAP controlling groups of similar appliances PC interfaces with high-level macros for applications such as Word. |
| User dependent speech accessors with medium size vocabularies. | |
| Intelligent video sensors for simple gestures | |
| High-Level Accessor | Specialized ITAP |
| Fast notebook, desktop and high-performance embedded processors | ITAPs designed for proprietary systems Complex CADD systems Industrial control systems |
| Large vocabulary, user independent speech recognition | |
| Image recognition sensors for complex gestures | |

Organization of ITAS

Figure 23:
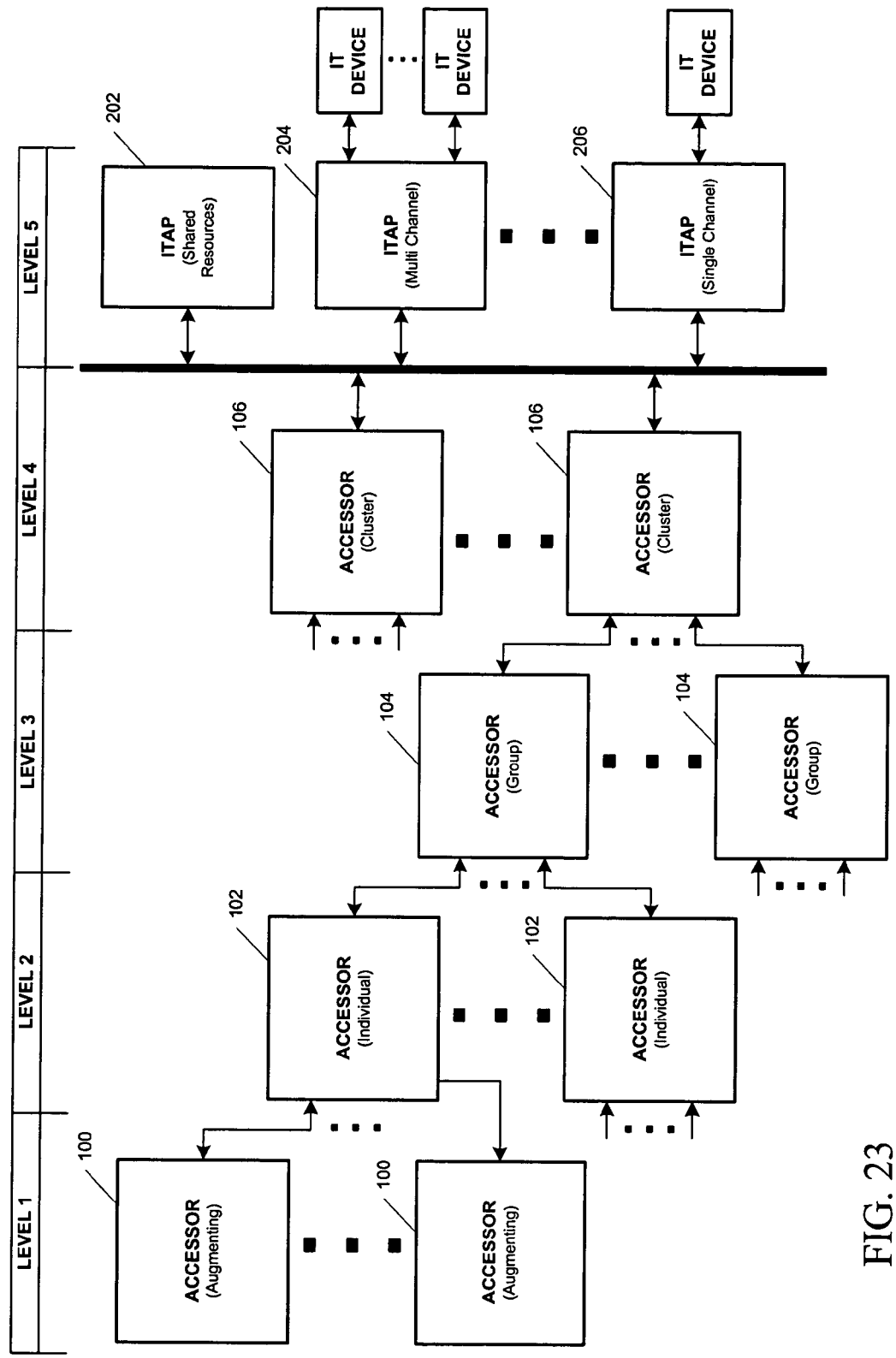
FIG. 23 illustrates a distributed structure of an ITAS.

As depicted in FIG. 23, the ITAS has a distributed structure that has accessors 100, 102, 104, 106 in a hierarchical organization and ITAPs 202, 204, 206 in a parallel organization. This results in an extremely flexible system with many intrinsic benefits. This organization for the ITAS evolved as a way of satisfying three major goals: (i) minimizing hardware and software complexity; (ii) maintaining low latency between user actions and device responses; and (iii) eliminating built-in and version obsolescence.

The complexity of the ITAS is kept low by partitioning functionality and distributing intelligence across a selection of relatively simple modules. The overall ITAS can be considered as an asynchronous system in which each module (i.e., accessor or ITAP) is responsible for processing all input data in the shortest possible time and passing the results on to the next module in the chain. The internal operation of each module is optimized for a particular function and is independent of all other modules. In most cases, natural human language is used for communication between modules. The exception to this is when an accessor is emulating a time-dependent peripheral, like a mouse, and sends its output encoded as standard mouse packets. These packets bypass the internal processing of any intermediate modules and are conveyed to the target device with minimum possible delay.

Figure 24:
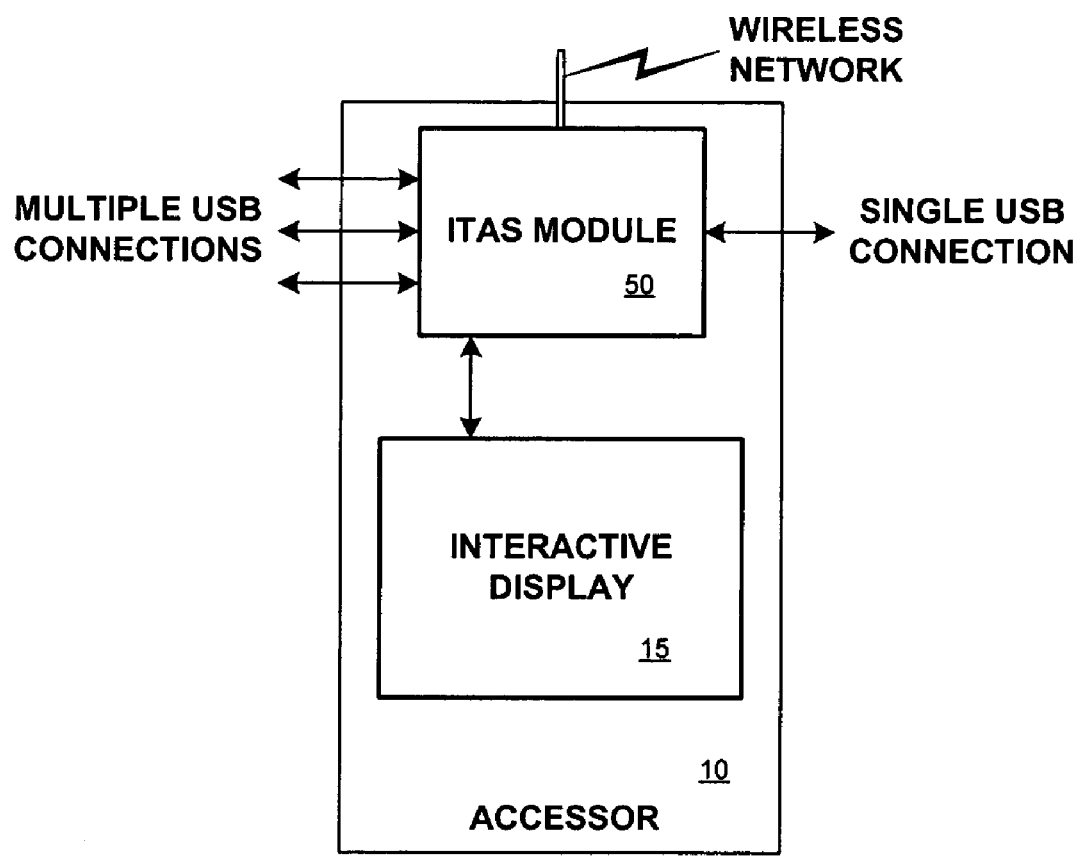
FIG. 24 illustrates the basic components of an accessor.

FIG. 24 shows the functional components of an accessor 10, the basic building block for the ITAS system. An ITAS module 50 performs all ITAS communications and natural interaction processing, and an optional interactive display 15 provides user interaction appropriate for the level of the accessor within the system. The intelligence and behavior of an accessor 10 are established by an IMNIP contained in the ITAS module 50.

This modular organization eliminates the need for a centralized operating system and dependence on third party software developers. Each module is designed to perform its designated function with minimum dependency on other modules, and to present its results in a format that can be used by any other module in the system. Detailed design concepts for the various modules are described below.

Timing considerations have dominated the design of the ITAS since its overriding purpose is to enable a person to interact with and control one or more target IT devices or appliances in real time. Communications between ITAS components, and between ITAS and the devices that are being controlled, can be wired, wireless, or a combination of both. Wired systems are simpler to design and implement but wireless systems are more convenient to install and use. Convenience is driving the transition to a wireless infrastructure and several emerging standards, such as Blue-Tooth, IEEE 802.11b (WiFi), and IEEE 802.15 (ZigBee) are competing for market share. There are significant economic advantages in embracing one or more of these general-purpose RF standards for the ITAS. However, they do introduce a number of problems due to complexity, power consumption and high latency under some operating conditions.

The real-time command and control requirements make low system latency essential from the time the user expresses an intention until a target device receives a command. Some accessors emulate mouse-like devices that produce streaming data, which must be passed directly to the target device without interpretation by an IMNIP and with minimum delays. Commands that are built from multimodal inputs depend on the relative timing of the various inputs. Consistent timing is required for the processing performed within individual accessors to enable targeted ITAPs to resolve competing or collaborating commands received from multiple accessors. Some target devices require the ITAP to deliver sequential commands within tight timing constraints.

Latency is important in the ITAS because people are attuned to receiving an instant response when they perform simple actions such as typing a character, clicking a mouse button or turning on a light. For this type of activity, latency of up to about one hundred milliseconds goes unnoticed but above this, the operation becomes unnatural and disconcerting. A latency of 100 to 200 milliseconds can normally be tolerated for computer inputs. Video gaming systems, however, require the latency to be less than 20 milliseconds.

There are three main factors that determine latency in the ITAS. The first factor is the time required for the wireless system to sniff out available target modules and to bond one module to another. Bonding typically takes several seconds but should only be necessary at the beginning of a session. Some power-saving strategies, however, terminate and restart sessions frequently. While making sessions persistent minimizes the time required for bonding, it increases the power consumption and limits the operational time available in battery-powered devices. The second factor is the time required for processing information within each module before it is ready to be transferred to the next module in the chain. The ITAS reduces processing delays by distributing intelligence across all of the modules. This allows decisions about user intent to made as close as possible to the source of the information upon which the decision is based. For instance, each of the accessors shown in FIG. 23 has its own IMNIP that is responsible for extracting intent from received inputs. Distributing the intelligence in this way minimizes the amount of data that is sent back and forth between accessors. The unique design of the IMNIP reduces the overall processing time by incrementally decoding inputs as each character of a message is received; and by eliminating meaningless words, replacing synonyms, and standardizing commands as each accessor processes a message. The third factor is the transmission time required for transferring messages between each of the participating modules. Keeping messages short and dense minimizes transmission time. The ITAS achieves this by exchanging carefully packed buffers in each of the modules on a regular schedule.

Obsolescence is one of the main economic driving forces of the computer industry. Potential users of the ITAS such as disabled and aging people do not have the resources to continually purchase new equipment. ITAS has been designed from the beginning with the goal of making each functional module immune to obsolescence. There are several strategies for achieving this goal. One strategy is using natural human language to pass commands from one accessor to another. The word "on," for example, has the same meaning regardless of the type of accessor that generates or receives it. Word meaning is also independent of the order in which accessors are cascaded. Another strategy is encapsulating specialized functions within individual accessors. A speech accessor, for instance, uses a microphone to detect speech and outputs textual commands and content. The internal operation of the speech accessor is immaterial to the ITAS as long as all command words are consistent with the ITAS corpus. The IMNIP in a speech accessor translates spoken user commands into ITAS words. Spoken words that do not match the ITAS corpus may be optionally discarded or passed on for interpretation by a higher-level accessor or ITAP.

The ITAS communications must support two distinct requirements that cannot be satisfied completely with any one of the currently available wireless protocols. These requirements can be summarized as follows:

(i) secure, low latency entry of text, keyboard commands, pointing commands, and button clicking to accessors and ITAPs at any level;

(ii) high bandwidth, industry standard data transfer for updating display screens, Web browsing, email, and exchanging large files between individual accessors and a centralized resource.

The wireless communications industry is still in a state of confusion with several emerging standards vying for domination in each of the identifiable market spaces. This has made it very difficult to choose an optimum communications strategy for the ITAS. It is already clear, however, that no single protocol will satisfy all of the ITAS requirements. While there is a strong temptation to create a new ITAS-specific communications solution, this would limit options for incorporating low-cost, off-the-shelf components and products as they become available. There is also the unresolved question of whether optical techniques (infrared or lasers) or radio frequency techniques might be better for particular applications within the ITAS. There is also the question of whether Ultra Wide Band (UWB) technologies will provide the best overall solution for ITAS in the longer term.

The current version of the ITAS protocol defines the necessary communication functions within the framework of three standards, one wired and two wireless:

(i) USB (hard-wired or wireless) for transferring commands and data between accessors, ITAP and USB-equipped target devices;

(ii) ZigBee (IEEE 802.15.4) for transferring control and status information between accessors, ITAPs and target devices;

(iii) WIFI (802.11X) for transferring screen data and large files between accessors and a centralized resource device, and for web browsing.

The performance advantages of using three standardized communication protocols within the ITAS far outweigh the additional cost and complexity. For example, low-speed user input does not interfere with the screen updates and large web page or data files can be transferred to and from accessors without impacting critically-timed control messages to target devices.

The system is also much more stable since each module performs all processing functions independently and asynchronously. This allows each module to gather available inputs and process the data as quickly as possible without any dependencies on what is happening within other modules. As soon as they are generated, results are placed in an output buffer and transferred to the next module on the very next wireless cycle.

Figure 25:
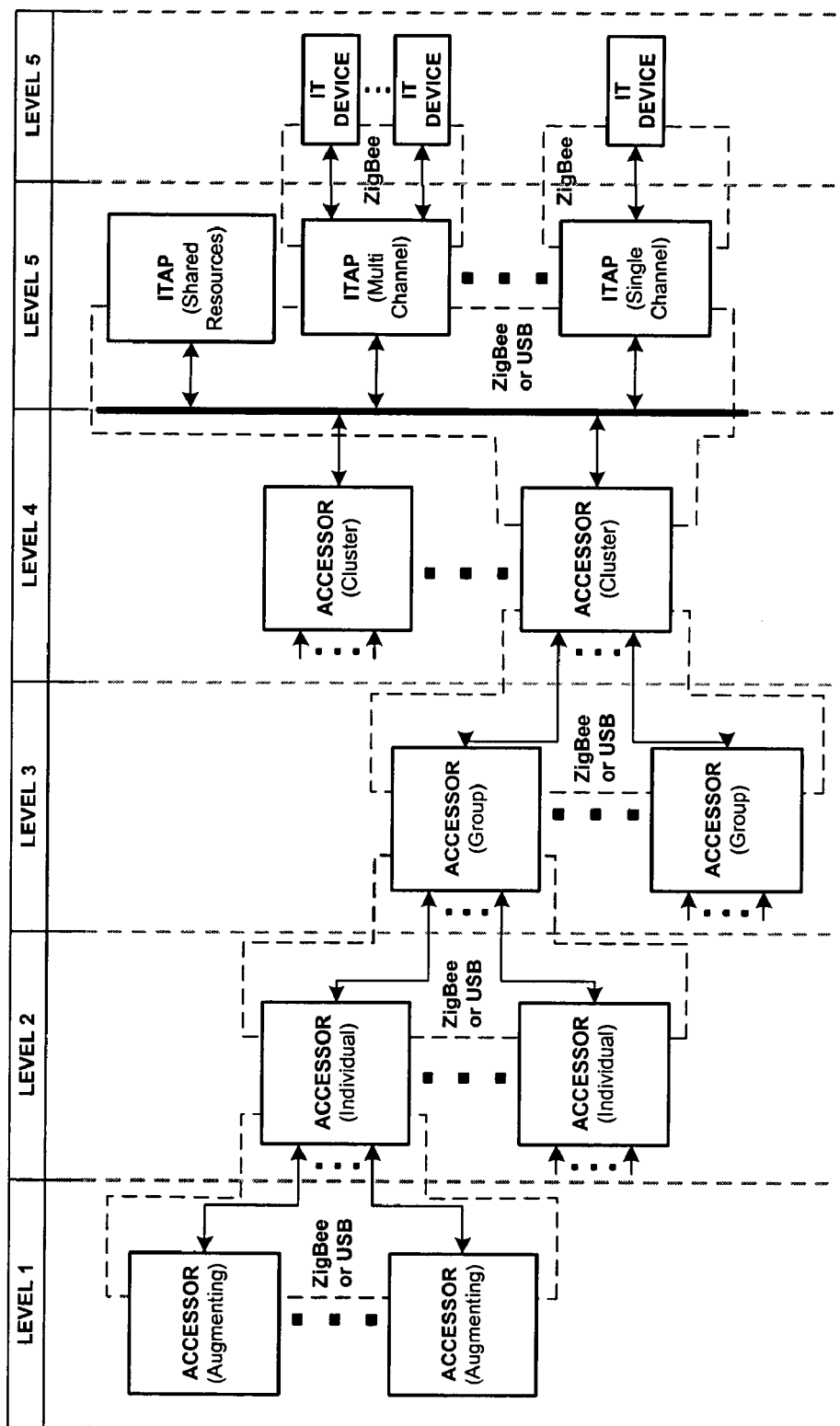
FIG. 25 illustrates an embodiment having ZigBee wireless networks and USB cables for level-to-level communications.

Each of the regions outlined with dashed lines between plural accessor modules in FIG. 25 represents a small master/slave network implemented with ZigBee wireless or USB cables. The USB connections can be also be made wireless by inserting a pair of USB wireless transceivers in place of the USB cable. In all cases, the connections are bi-directional, supporting acknowledgement of all transactions, and allowing information to be transferred in either direction. Each accessor contains a proprietary ITAS driver that handles the transmission of ITAS commands and data in either direction. The ITAS driver chooses the wireless or USB paths automatically based on whether it detects the presence of an active USB connection. ITAS packets are used for all transmission over the ZigBee wireless connections. When a USB cable is in use, however, the ITAS driver can send two different types of data packets: (i) ITAS packets that are handled by the ITAS drivers, and (ii) standard USB human interface device (HID) packets. These USB packets are generated by a USB emulator in the lower-level accessor and processed as normal USB keyboard and mouse inputs by the standard operating system HID drivers in the higher-level accessor. This enables an accessor to directly control any IT device that has a USB port by emulating a standard USB keyboard and USB mouse.

Figure 26:
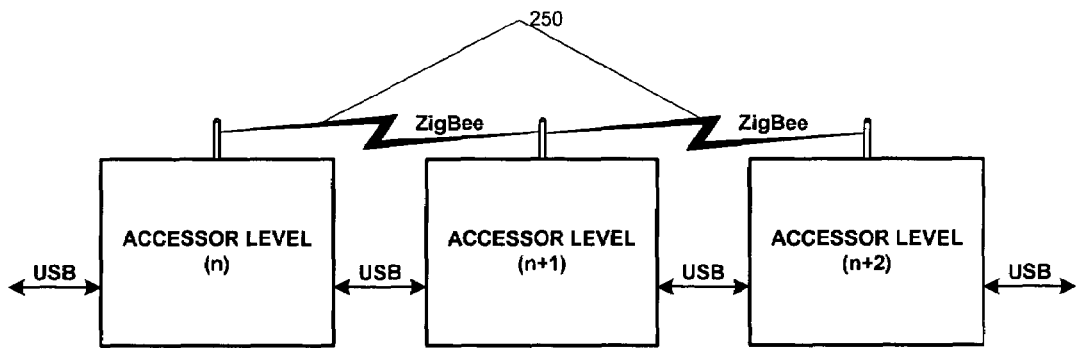
FIG. 26 illustrates accessor-to-accessor communication.

FIG. 26 shows how accessors are connected from one level to the next using either USB wireless or USB cable for communications. The configuration shown in FIG. 26 has the advantage of allowing unmodified, off-the-shelf USB interface devices to be used as standard inputs to any accessor. It also allows any accessor to become a standard USB human interface device (HID) by plugging it into a USB port on the device. If the accessor is unable to find an ITAS driver in the target device it will automatically send only standard keyboard and mouse packets.

Figure 27:
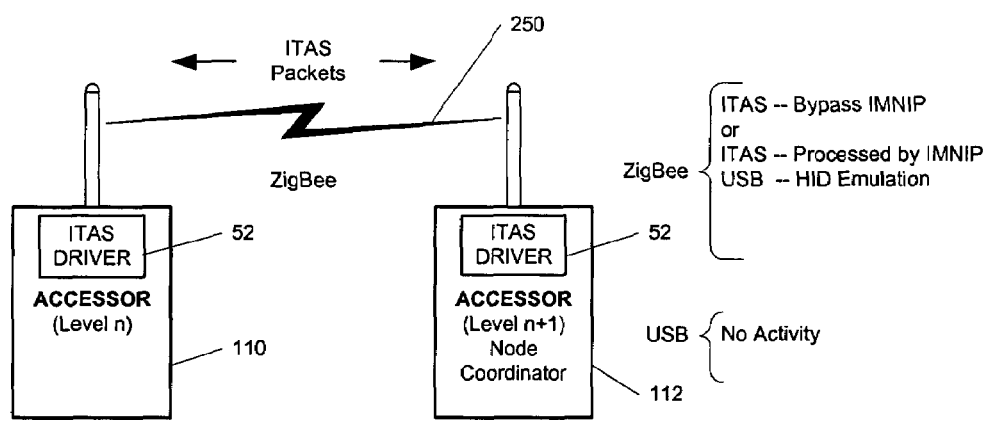
FIG. 27 illustrates wireless accessor to accessor communications.

The ITAS driver performs all of the functions required for selecting the communications mode and managing data transfers. FIG. 27 shows the normal ZigBee-based wireless communications 250 between two accessors 110, 112 containing ITAS drivers 52. The higher-level accessor 112 is configured as the Node Coordinator (NC) and the lower-level accessor 110 is configured as a node (N). Depending on flag settings in their headers, ITAS packets sent by the node 110 are processed by the IMNIP in the NC 112 for extraction of intention, and sent directly to the output of the NC, thereby bypassing the NC IMNIP, or decoded as USB signals that emulate standard human interface devices such as a keyboard or mouse for controlling the higher-level accessor 112.

Figure 28:
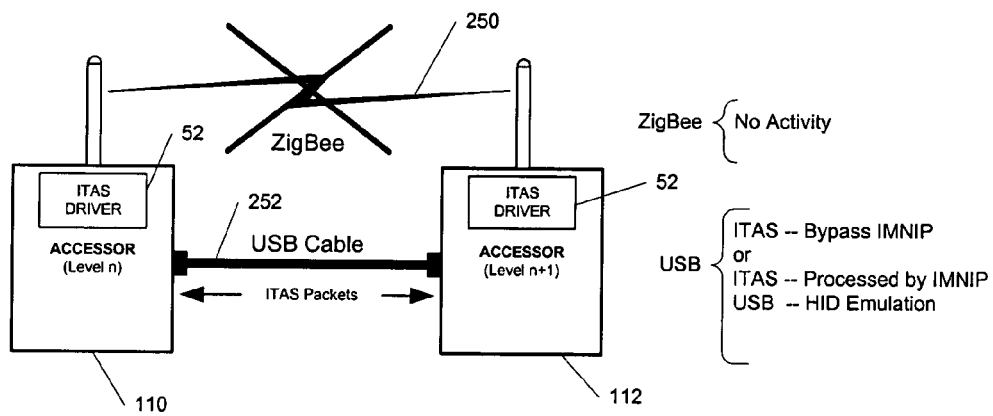
FIG. 28 illustrates accessors connected by a USB cable.

The same results can be achieved by connecting two accessors 110, 112 through a USB cable as shown in FIG. 28. The ZigBee connection 250 between two accessors 110, 112 is disabled whenever the ITAS drivers 52 discover that a USB cable 252 is available to connect the accessors. There are three main reasons for using a USB cable: (i) using peripheral input devices when the use of wireless devices is prohibited, as in an aircraft, (ii) a faster connection is required, and (iii) the accessors are part of a permanent installation where there is no need for wireless connections.

Figure 29:
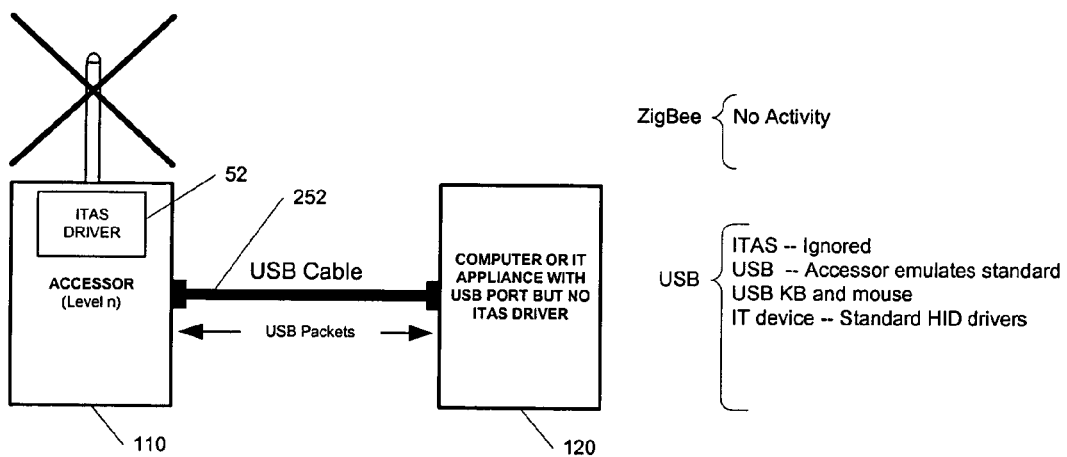
FIG. 29 illustrates accessors connected to a USB port on a non-ITAS device.

All ITAS communication functions are inhibited when a USB cable connects an accessor 110 to a non-ITAS computer or IT appliance 120, as depicted in FIG. 29. The accessor 110 controls the target device by emulating the operation of a standard USB keyboard and standard USB mouse. The target uses standard USB HID drivers to handle keyboard and mouse inputs from the accessor.

Figure 30C:
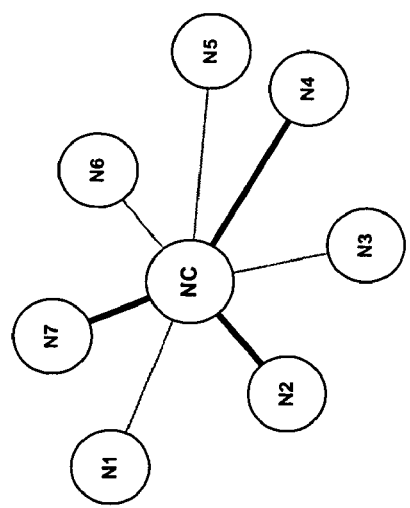
FIGS. 30A-30C illustrate physical and virtual representations of a ZigBee network.
Figure 30B:
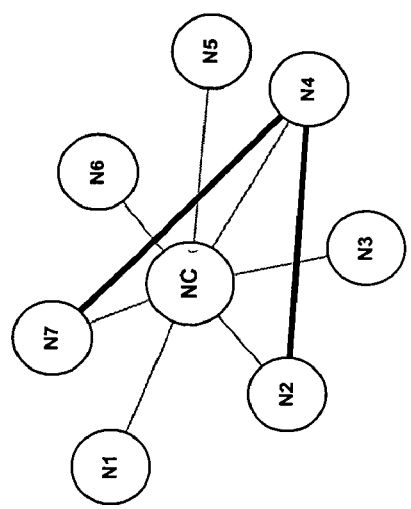
Figure 30A:
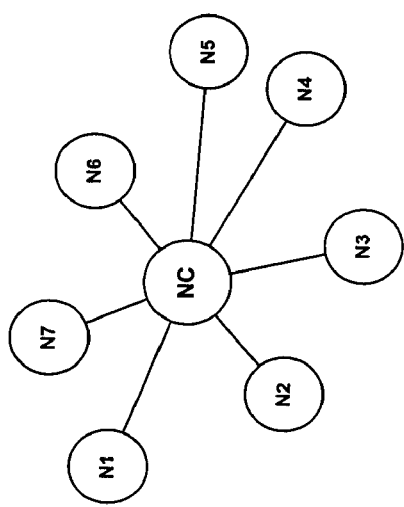

FIGS. 30A-30C provide three views of a simple ZigBee network similar to what is used in the ITAS. The physical network shown in FIG. 30A consists of a single Node Coordinator (NC) and seven nodes (N). All communications occur between the NC and one of the nodes. Pairing individual nodes in a table maintained by the NC creates virtual networks. FIG. 30B depicts a virtual network in which N4 is a master and N2 and N7 are slaves. The data paths forming the virtual network are shown by the heavy lines in FIG. 30C.

Figure 31B:
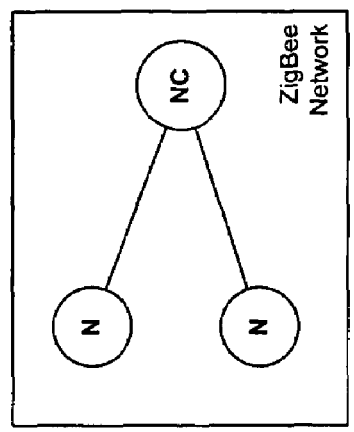
FIGS. 31A-31B illustrate a ZigBee network linking individual and augmenting accessors.
Figure 31A:
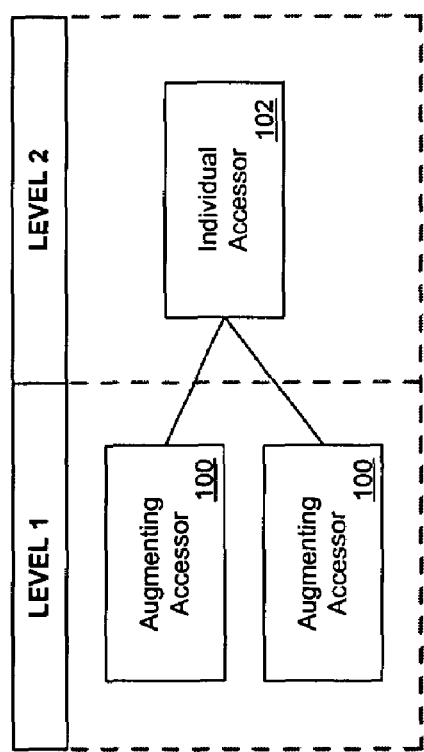

FIG. 31A shows the simplest arrangement of an ITAS network in which a person is using an individual accessor 102, such as a tablet, in a stand-alone mode. Augmenting accessors 100 such as a speech recognizer and a head tracker provide additional inputs to the tablet. FIG. 31B shows how this is achieved configuring the individual accessor 102 as a ZigBee node controller and each of the augmenting accessors 100 as ZigBee nodes.

Figure 32C:
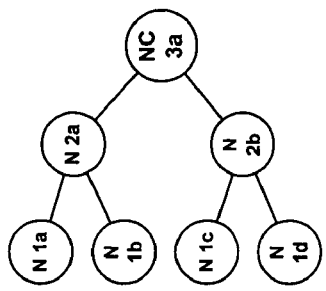
FIGS. 32A-32C illustrate a ZigBee realization of a three-level deep ITAS network.
Figure 32B:
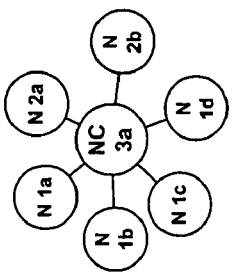
Figure 32A:
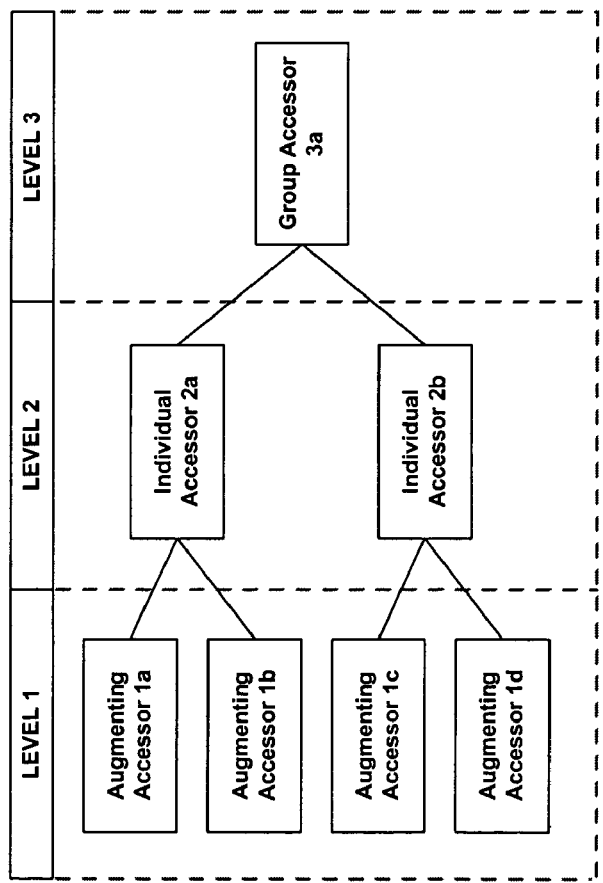

FIG. 32A depicts a situation in which two individuals, each with their own particular selection of augmenting accessors, are collaborating to perform a task on a group accessor. Implementing this configuration requires that the group accessor becomes the Node Coordinator and the other six accessors are configured as nodes. FIG. 32B shows how this would appear as a ZigBee network, and FIG. 32C shows the virtual network that performs the accessor functions.

The process of moving the Node Coordinator to the root accessor in the hierarchically organized ITAS network applies regardless of whether or not all of the intermediate levels are present.

Figure 33:
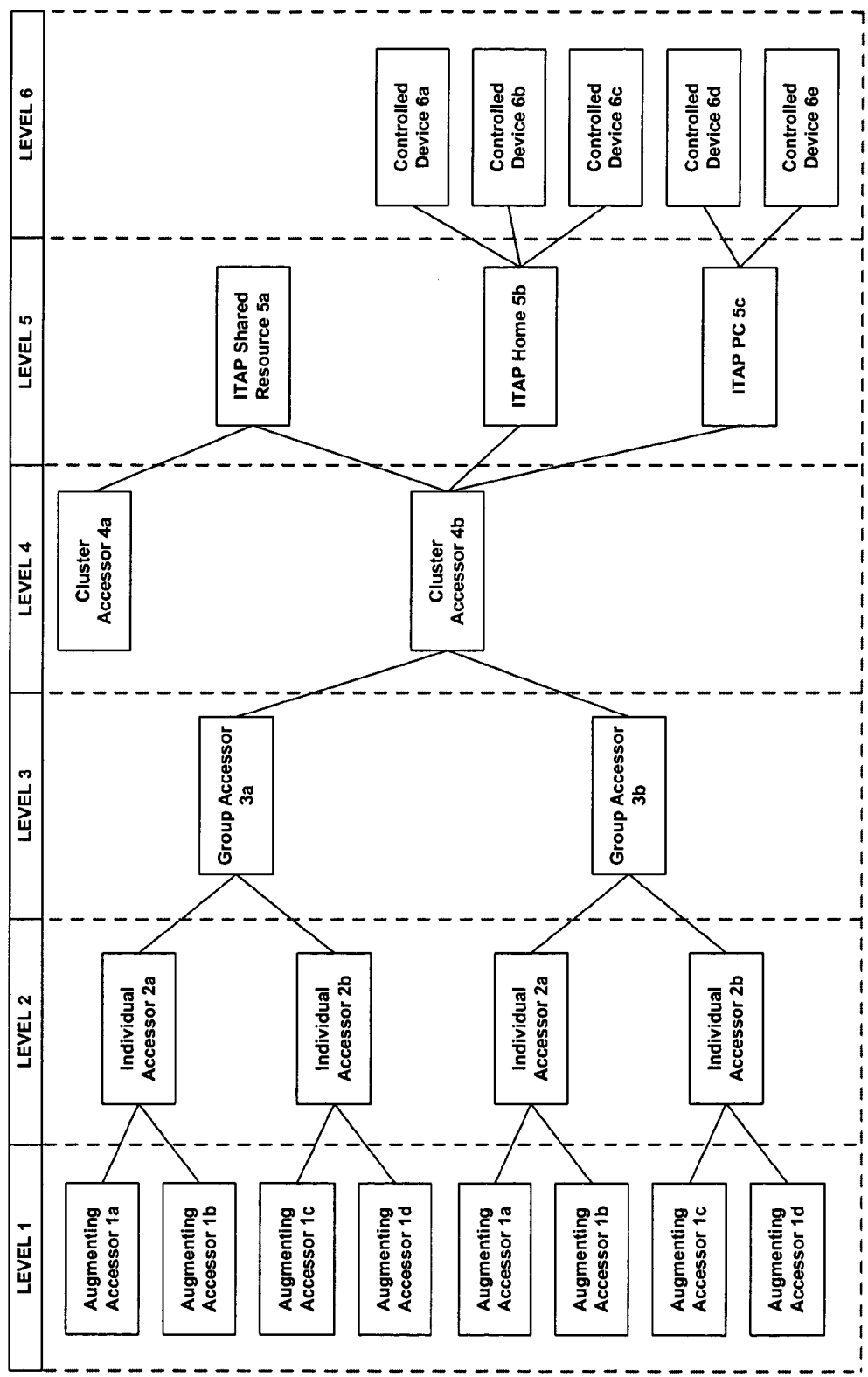
FIG. 33 illustrates an embodiment of an ITAS in which multiple users can control PC and home resources.

In a fully configured ITAS, the Node Coordinator will normally reside in the shared resource ITAP (see level 5 in FIG. 33). One of the other ITAPs will become the Node Coordinator if there is no shared resource ITAP in the system. A single Node Coordinator can manage a maximum of 255 nodes. If this number is likely to be exceeded, a second level of node coordinators will be established at the cluster level (level 4). The cluster accessors will then become nodes to the ITAP (Level 5) Node Coordinator.

An advantage of this configuration is that, within each ZigBee network, only two hops are required to link any accessors and ITAPs—one from the first node to the Node Coordinator, and one from the Node Coordinator to the second node. While this doubles the time required to move between adjacent levels, it has the advantage of eliminating the need for messages to pass through accessors that do not perform any IMNIP functions. This reduces the latency on messages that must be passed quickly from a source accessor to a target ITAP. Streaming mouse signals, for instance, will reach their destination in just two hops rather than being passed through every accessor in the chain. Latency is less of an issue for messages that are processed by an IMNIP because these are generally limited by the relatively slow rate at which a human can enter words into an accessor or enter coordinated inputs on several accessors.

FIG. 33 depicts a fully implemented ITAS that is populated with accessors and ITAPs at all levels. A single Node Coordinator can be used if the total number of nodes is less than 255. In this case the shared resource ITAP will normally be configured as the Node Coordinator. In some situations, each device-controlling ITAP is configured as a Node Coordinator for talking to a set of devices and as a node for communicating with the rest of the ITAS.

Figure 34B:
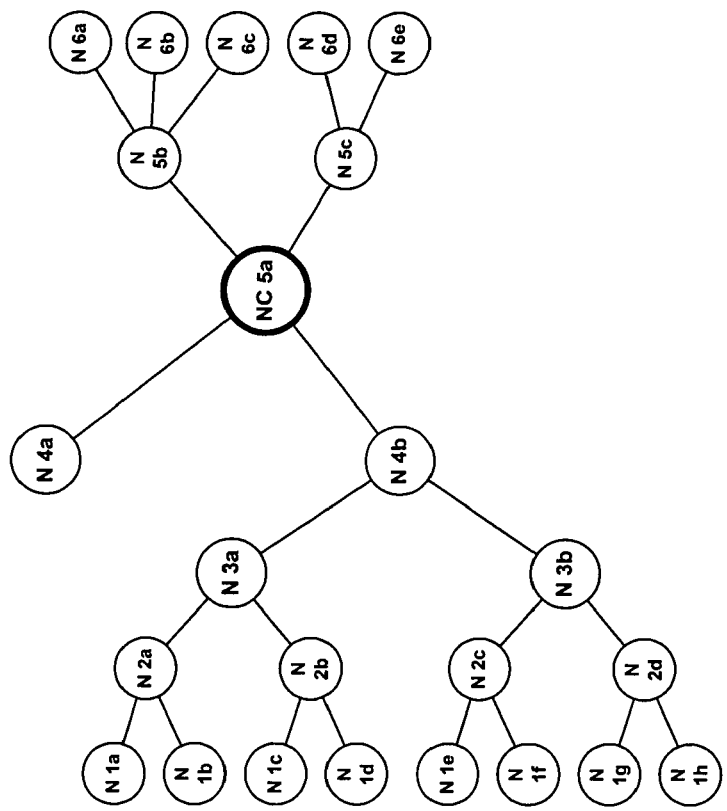
FIGS. 34A-34B illustrate physical and virtual networks matching the ITAS embodiment of FIG. 33.
Figure 34A:
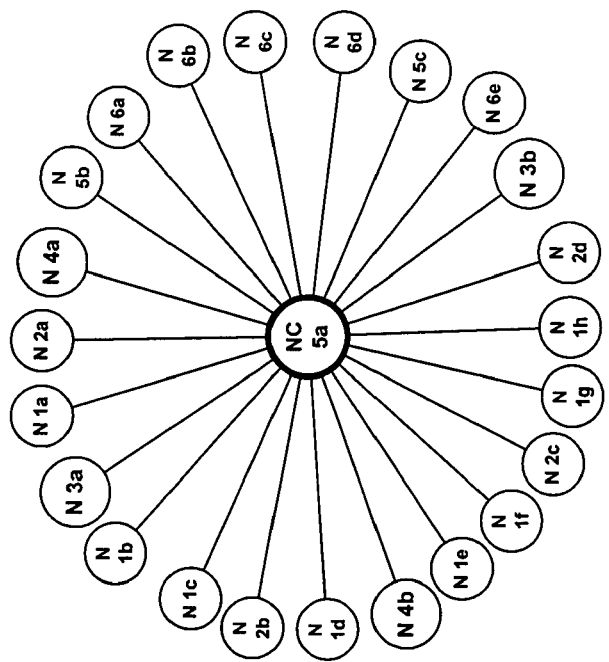

FIGS. 34A-34B show the physical ZigBee network and virtual ZigBee network, respectively, corresponding to the ITAS network depicted in FIG. 33.

Figure 35:
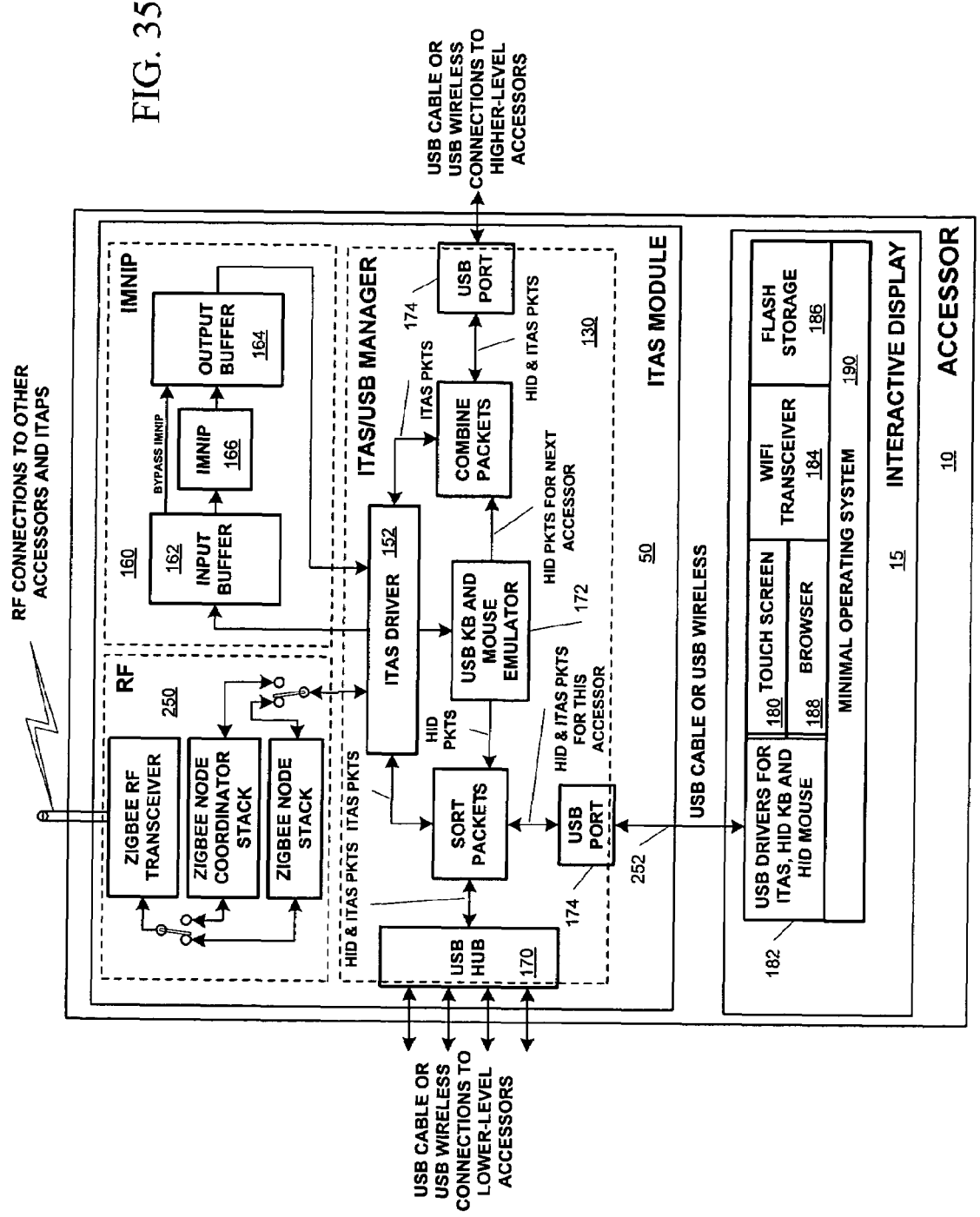
FIG. 35 illustrates an embodiment having an accessor with ZigBee and USB communications components.

As depicted in FIG. 35, an accessor 10 includes two major functional blocks: (i) an ITAS module 50 that handles all communications and interpretation of user commands; and (ii) an interactive display 15. The ITAS module 50 further includes three functional blocks that provide USB communications, wireless communications, and an IMNIP. This organization of the accessor 10 has two major advantages over other possible options: (i) it allows all ITAS functions to be implemented independently of the interactive display, and (ii) functionally identical ITAS modules 50 are used for all levels of accessors and ITAPs with the only difference being the corpus used by each IMNIP.

With reference to FIG. 35, the ITAS module includes the ITAS/USB manager 130, the IMNIP 160, and the Zigbee wireless system 250. The three functional blocks together perform all of the necessary ITAS-related functions.

The ITAS/USB Manager 130 receives, routes, and transmits ITAS and HID packets through either USB 252 or Zigbee 250 communication channels. The core of the ITAS/USB Manager 130 is the ITAS driver 152. The ITAS driver 152 is responsible for selecting and maintaining the correct communications channels for accessor-to-accessor and accessor-to-ITAP interactions. A standard USB hub 170 allows multiple lower-level accessors to be connected to the accessor. The ITAS driver 152 handles three types of packets: (i) ITAS packets, (ii) HID packets, and (iii) internal representations of packets.

The IMNIP 160 integrates multiple data streams received from the ITAS/USB Manager 130 and performs the NIP processes specified by the ITAS header. Four types of output are provided by the IMNIP: (i) ITAS packets destined for lower-level or higher-level accessors or ITAPs; (ii) ITAS packets destined for the attached interactive display, (iii) keyboard or mouse commands for controlling the attached interactive display; and (iv) keyboard or mouse commands for controlling the next higher-level accessor.

The Zigbee wireless system 250 connects to lower-level and higher-level accessors and to ITAPs. Within each accessor, the Zigbee wireless system can function either as a Node Coordinator, when it is in the highest-level device in the network or as a node when there is already a higher-level device in the network. A different protocol stack is used for each operating node.

The ITAS driver 152 performs the following functions:
1. determining whether to use USB or Zigbee to communicate with lower-level and higher-level accessors or ITAPs;
2. receiving ITAS packets from higher-level or lower-level accessors for the interactive display to which it is connected;

3. transmitting ITAS packets to higher-level or lower-level accessors or the interactive display 15 to which it is connected;
4. routing incoming ITAS packets to the IMNIP 160;
5. formatting ITAS outputs produced by the IMNIP 160, and destined for other accessors or ITAPs, into ITAS packets and routing them to the intended destination using either USB or Zigbee; and
6. routing keyboard or mouse commands used by the IMNIP 160 to the USB keyboard and mouse emulator 172; USB HID packets generated by the emulator are sent to either the interactive display 15 or to the next higher-level accessor or ITAP.

The input section of the ITAS driver 152 manages the transfer of information between an accessor and all lower-level accessors by performing the following functions: (i) selecting input source; (ii) discovering potential communication partners; (iii) bonding to lower-level accessors; (iv) transferring data; (v) bypassing the IMNIP; and (vi) managing errors.

An ITAS driver 152 can simultaneously manage wired USB and ZigBee wireless communication channels. At any time, however, there can be only one active ITAS communication channel between any pair of accessors. Whenever an accessor is connected to another accessor by a USB cable 252, wireless communications between these accessors are turned off and all ITAS functions are performed through the USB channel. The ITAS driver is responsible for recognizing when another ITAS driver 152 can be reached over a USB channel.

Any accessor can communicate with one or more lower-level accessors. Discovery begins when an ITAS driver 152 receives a response from an ITAS driver that has a lower level number and is not bonded to another accessor. Both accessors indicate that a potential communication partner exists and wait for either an automatic or user-initiated response.

Discovered accessors must be bonded to each other before they can begin exchanging commands and data. Bonding can be initiated automatically if the two accessors recognize each other from ID numbers stored in their "Accessor Table." The ID in the table may be for a specific accessor, or for any member of a specified class of accessors. User intervention is required if matching IDs are not found in the accessor tables. A visual or textual description of available accessors is displayed on each accessor. The user may make a selection on either accessor to initiate bonding. To allow automatic bonding in the future, the user is given an option to load the accessor identities into the Accessor Table upon completion of the bonding process.

Each higher-level accessor periodically scans through all bonded lower-level accessors to exchange the contents of the output buffer in the lower-level accessor with the contents of an input buffer in the higher-level accessor. The higher-level accessor has a separate input buffer for each connected lower-level accessor.

The IMNIP 160 in an accessor does not process any packets that are received with their Bypass flag set. The ITAS driver 152 tests the Bypass flag as each data packet is received. If the flag is set, the contents of the input buffer are moved directly to the output buffer as soon as space is available. The ITAS driver 152 checks for logical errors in all incoming data packets. A detected error causes the complete buffer to be resent.

The output section of the ITAS driver 152 manages the transfer of information between: (i) an accessor and one higher-level accessor, (ii) an accessor and an ITAP, or (iii) an accessor and a target IT device that has a USB port 174.

An ITAS driver 152 manages the connection to a single higher-level device. The connection may be over a USB cable 252 or a ZigBee wireless channel 250. If a USB cable connection 252 is detected, the ITAS driver 152 will test to see if it is attached to a higher-level accessor or ITAP with an active ITAS driver. If it is, the USB cable 252 becomes the default connection and the ZigBee wireless channel 250 between the two devices is turned off. If no ITAS driver is detected, the accessor emulates standard USB keyboard and mouse devices if instructed to do so by the user. An accessor cannot send USB keyboard or mouse signals to a lower-level device.

Discovered accessors must be bonded to each other before they can begin exchanging commands and data. Bonding can be initiated automatically if the ID of each accessor is contained in an "Accessor Table" in the other accessor. The table ID may be for a specific accessor, or for any member of a specified class of accessors. User intervention is required if matching IDs are not found in the accessor tables. A visual or textual description of available accessors is displayed on each accessor. When the user selects a desired connection, the ITAS drivers will complete the bonding process. The user is given the option of loading the accessor identities into the Accessor Tables to allow automatic bonding in future.

Figure 36:
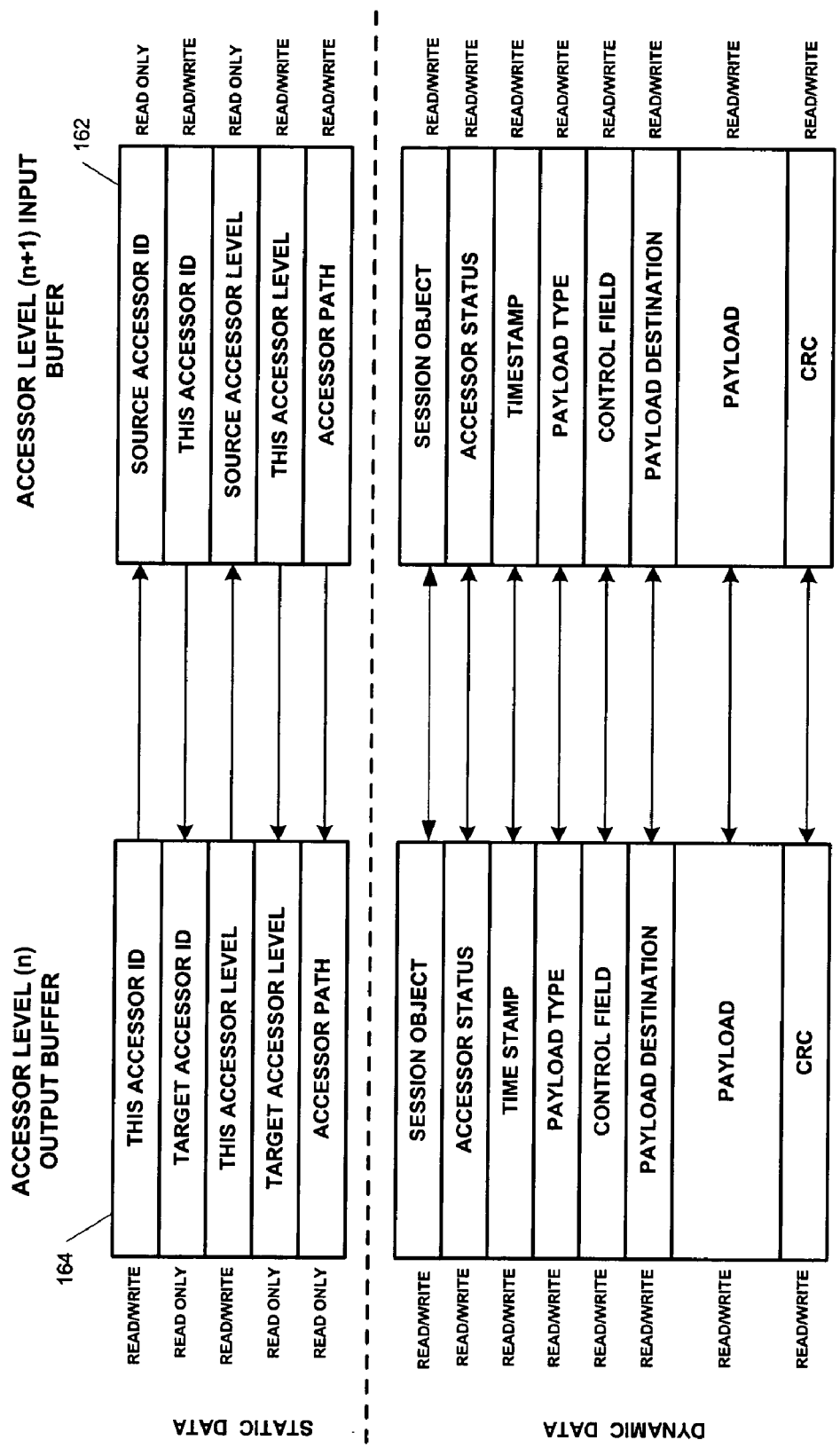
FIG. 36 illustrates organization of accessor input and output buffers.

Each higher-level accessor periodically scans through all bonded lower-level accessors to exchange the contents of the output buffer in the lower-level accessor with the contents of an input buffer in the higher-level accessor. The higher-level accessor has a separate input buffer for each connected lower-level accessor. Organization of the input 162 and output buffers 164 is illustrated in FIG. 36.

The IMNIP 160 in an accessor does not process any packets that are received with their Bypass flag set. The ITAS driver 152 tests the Bypass flag as each data packet is received. If the flag is set, the contents of the input buffer 162 are moved directly to the output buffer 164 as soon as space is available. The ITAS driver 152 checks for logical errors in all incoming data packets. A detected error causes the complete buffer to be resent.

The functions performed by the interactive display 15 are shown in FIG. 34. The simplest configuration is a small touch-screen tablet computer 180 with USB 182 and WiFi 184 communications and flash memory 186. Any computer or IT device capable of performing these functions may be used. The design goals for the interactive display 15 are to present high-quality graphics, video, and audio to the user at the lowest possible cost. Fundamental design requirements include simple operation, instant on/off, stable and predictable behavior, and immunity from version obsolescence. The basic purpose of an accessor is to control user-accessible interface operations on another device, not to replace the operational functions of the other device. As such, the operating system 190 and application software used in an accessor 10 can be much simpler and therefore more stable than the software used to perform similar functions in a target computer or IT device. In some situations, the functions of an accessor and target computer may be merged into a single system.

The capabilities of the interactive display 15 are deliberately limited to the following essential functions: USB support 182 for HID keyboard, HID mouse, and ITAS packets; a touch screen 180; a browser 188 with flash viewer; WiFi communications 184 for delivery of web pages and files; and flash memory 186 for file storage. This limited and stable range of required functions allows for a relatively simple operating system 190 to be used. This operating system will support instant-on capabilities.

The performance requirements for an accessor browser 188 are much simpler than those of the browser in normal computers or IT appliances. Flash storage 186 is used in an interactive display 15 to minimize cost and to support instant on capabilities. USB drivers 182 are required for a standard HID keyboard, a standard HID mouse, and for custom ITAS data transfer. ITAS commands and data flow back and forth between the ITAS module 50 and the interactive display 15 over the USB connection 252. WiFi communications 184 enable the interactive display 15 to retrieve and display web pages and flash movies from the shared resource module or the Internet.

The touch screen 180 provides a basic interaction path for the user. Active areas on the touch screen 180 can be selected by touching them directly or by moving a curser over them using external mouse or keyboard commands received from the ITAS module 50 via the USB/ITAS connection 252. In some cases, active areas on the touch screen 180 generate commands for controlling operation of the interactive display 15 or interacting with web pages. In other cases, active areas of the touch screen 180 generate commands or parameters that are transferred to the ITAS module 50 via the USB/ITAS connection 182. The ITAS module 50 can take over selected areas of the screen 180 in the interactive display 15 as interactive control panels that enable the user to set up and control the operation of the ITAS module 50.

Figure 37:
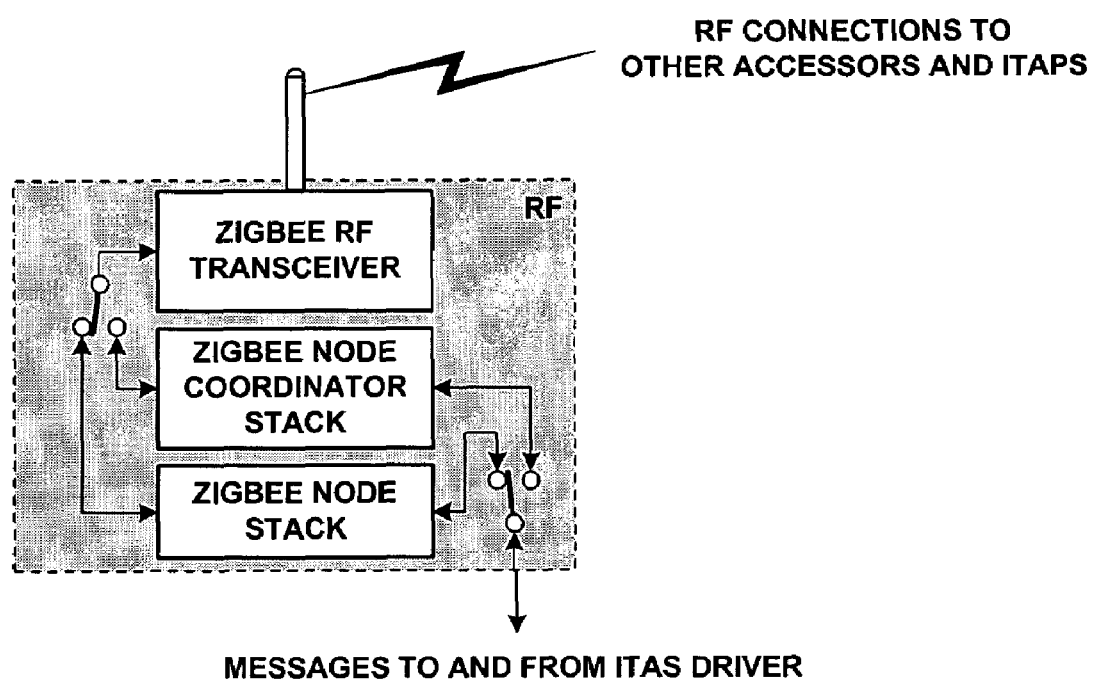
FIG. 37 illustrates switching modes between node and a node coordinator.

The ZigBee stack shown in FIG. 37 will be different for an accessor configured as a ZigBee Node Coordinator and one that is configured as a ZigBee node. Apart from Level 1, all accessors must be able to switch between being a node and being a Node Coordinator. The essential difference is the size of the ZigBee Stack, which is 4K for a node and 28K for a Node Coordinator. FIG. 37 shows how the mode switching can be achieved.

Information is transferred between accessors by exchanging an output buffer 164 in the lower-level accessor with an input buffer 162 in the higher-level accessor. The two buffers contain the same number of bytes. As depicted in FIG. 36, each buffer contains static information describing the accessors, including information about how they are connected, and dynamic information containing commands and text messages. The full buffer is exchanged during the initialization of the connection and any time the static information in one of the accessors is changed. At all other times, only the dynamic section of the buffer is exchanged. A flag in the packet header indicates whether the full buffer or only the dynamic section is being transferred. The information placed in the buffers 162, 164 includes the following:

(i) Accessor ID—every Accessor has a unique ID.

(ii) Accessor Level—each accessor has a default level that determines its order in the accessor path.

(iii) Accessor Path—each accessor is a member of a hierarchical tree. The Accessor Path lists the IDs of all of the higher-level accessors and ITAPs that are bonded on the particular branch of the tree. Each accessor adds itself to the beginning of the path. Accessors are always ordered according to their Accessor Level. Some levels may be skipped.

(iv) Session Object—a session is initiated when an accessor bonds to another accessor or ITAP and lasts until the bond is broken. The session enables the cooperating devices to coordinate and simplify collaborative activities.

(v) Accessor Status—each accessor maintains a set of status flags that are updated in real time and transferred to the other accessor each time the higher-level accessor performs a scan of all of its slave accessors. For example, the Command status flag reports whether a command is pending, being performed, completed successfully, or unsuccessful.

(vi) Control Field—may contain commands, error codes and mode controls such as setting the Communications Mode that controls whether ITAS packets are transferred between accessors over USB or ZigBee channels.

(vii) Payload Type—the payload delivered by an accessor can consist of: text for a higher-level accessor or an ITAP; commands for a higher-level accessor or an ITAP; and streaming data for an accessor or ITAP.

(vii) Payload Destination—within the Accessor Path, there can be only zero or one accessor at each higher level. The Payload Destination indicates the accessor or ITAP that is to receive the payload. The destination level must be occupied. When the destination is anything other than the local accessor, this register signifies a bypass operation in which the payload is sent directly to the output buffer as soon as it becomes available.

(viii) Payload—different types of payload are moved upstream and downstream through the bonded accessors. Upstream payloads include text strings, commands for upstream accessors or ITAPs, and streaming data. Downstream payloads include command requests such as bonding two accessors, performing and reporting the results of a self-test; lists of extension words to be added to the NIP parsing trees in lower-level accessors; text prompts to be displayed to the user; error messages to be displayed to the user without change; and error intent messages to be processed by a user IMNIP and presented in the most appropriate form for the user.

(ix) CRC—a Cyclic Redundancy Check is calculated for each complete buffer. If an error is detected, the contents of the buffer are ignored and a retransmission of the complete buffer is requested by loading a retransmit command into the payload.

Figure 38:
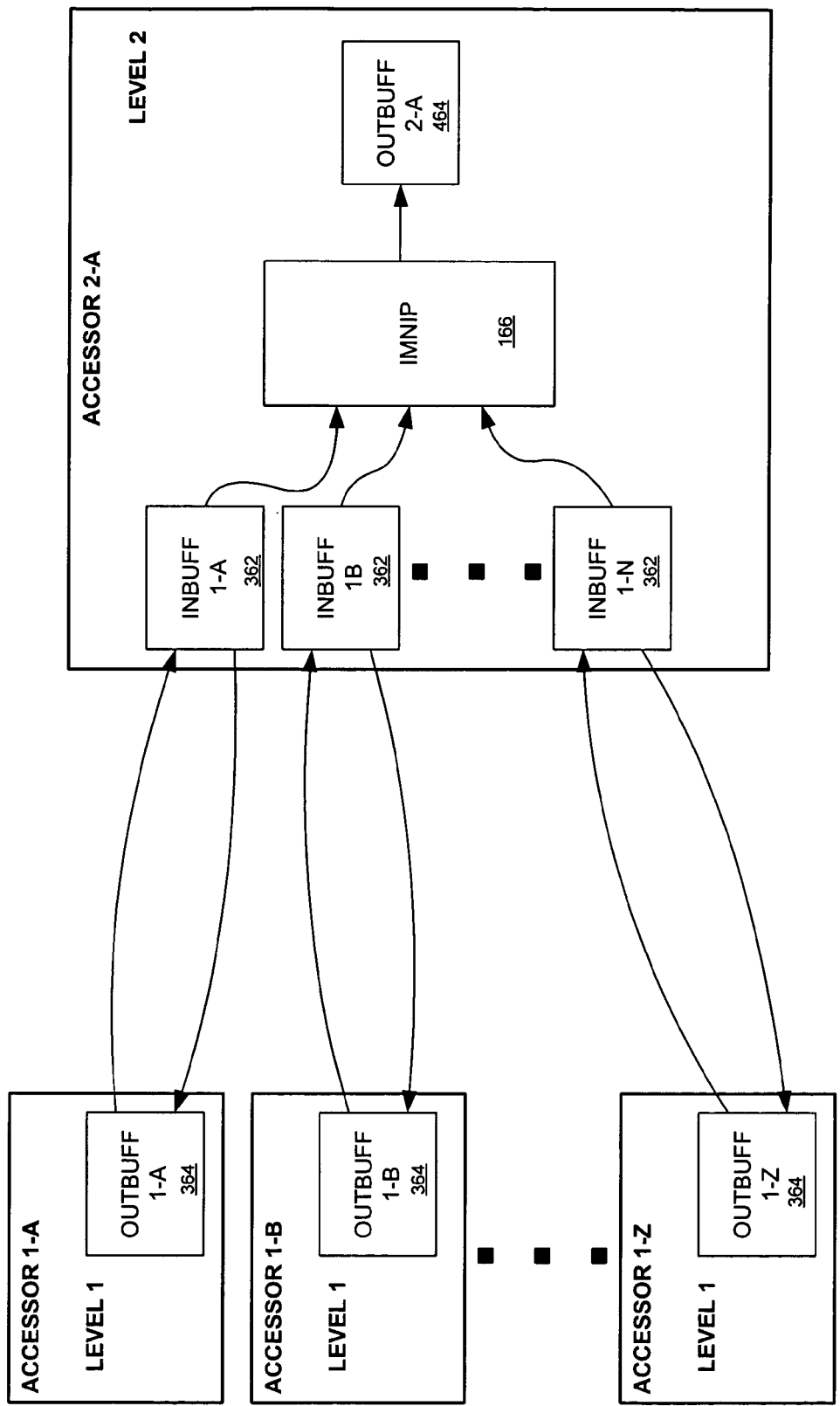
FIG. 38 illustrates consolidation of buffer contents from level to level.

As shown in FIG. 38, each accessor provides a separate input buffer 362 for each lower level accessor that bonds to it. The contents of the input buffer 362 provide constantly updated registers for sharing status information about the two accessors, command requests for the other accessor, information about the structure of the network that contains the accessor, and a payload that is either processed by the local IMNIP 166 or bypasses the local IMNIP 166 by being sent directly to the output buffer 464 for delivery the next accessor or ITAP in the path.

ZigBee—Communications from ITAPs to Target Systems

ITAPs 200 translate ITAS commands into control codes that are specific for each target device 40. The ITAP uses an IMNIP to derive the control codes from messages provided by one or more accessors. In most situations, the ZigBee wireless protocol is used to transfer control codes from the ITAPs 200 to the target devices 40.

From a closer look at the proposed ZigBee standard, it appears that it will be a better choice than wireless USB for connecting accessors to support human interface devices. While it has lower bandwidth, it has much a much faster turn-on and much lower latency. Most significantly, it has very low power requirements. Widespread industry adoption is anticipated for user interface devices and device control.

When used in conjunction with WiFi for screen delivery, browsing, and file transfer, the resulting ITAS system handles input from the user and outputs to the user in the most efficient manner. A brief summary of the specification for ZigBee is provided in Table 3.

TABLE 3

| | |
|---|---|
| Latency | ~20 ms |
| Data rate | ~115-240 Kb/S |
| Range | ~30-100 Meters |
| Topology | Star network |
| Master | single master for each network |
| Nodes | Up to 255 nodes per network |
| Co-location | Up to 100 networks may be co-located |

WiFi (802.11x) Communications Network

Figure 39:
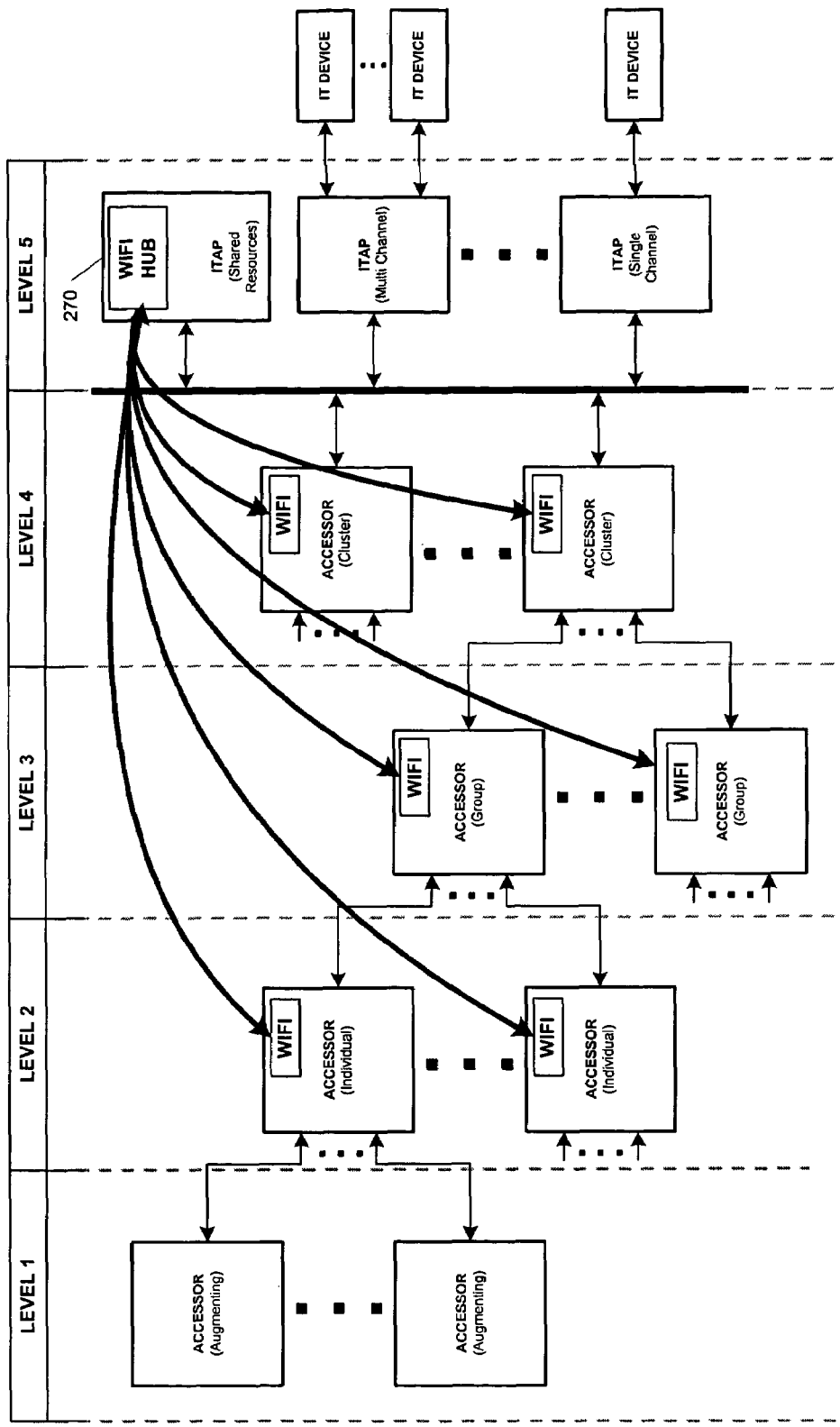
FIG. 39 illustrates an embodiment having WiFi connections for high bandwidth functions.

The ITAS system has conflicting requirements for communicating inputs from users and outputs to users. Text and commands are best handled by the ZigBee standard protocol and display requirements are best handled by one of the 802.11x protocols. This division of functions leads to an efficient design in which one channel provides low latency and low power consumption with a large number of available channels, and the other channel provides a high-speed network that will transfer video, still images, graphics, audio, and large data files and support applications such as Web browsing and email. As depicted in FIG. 39, the WiFi hub 270 is configured as a shared resources ITAP that supports a variety of special applications along with LAN and Internet connections.

Example of Mixed ZigBee and WiFi Operations.

Figure 40:
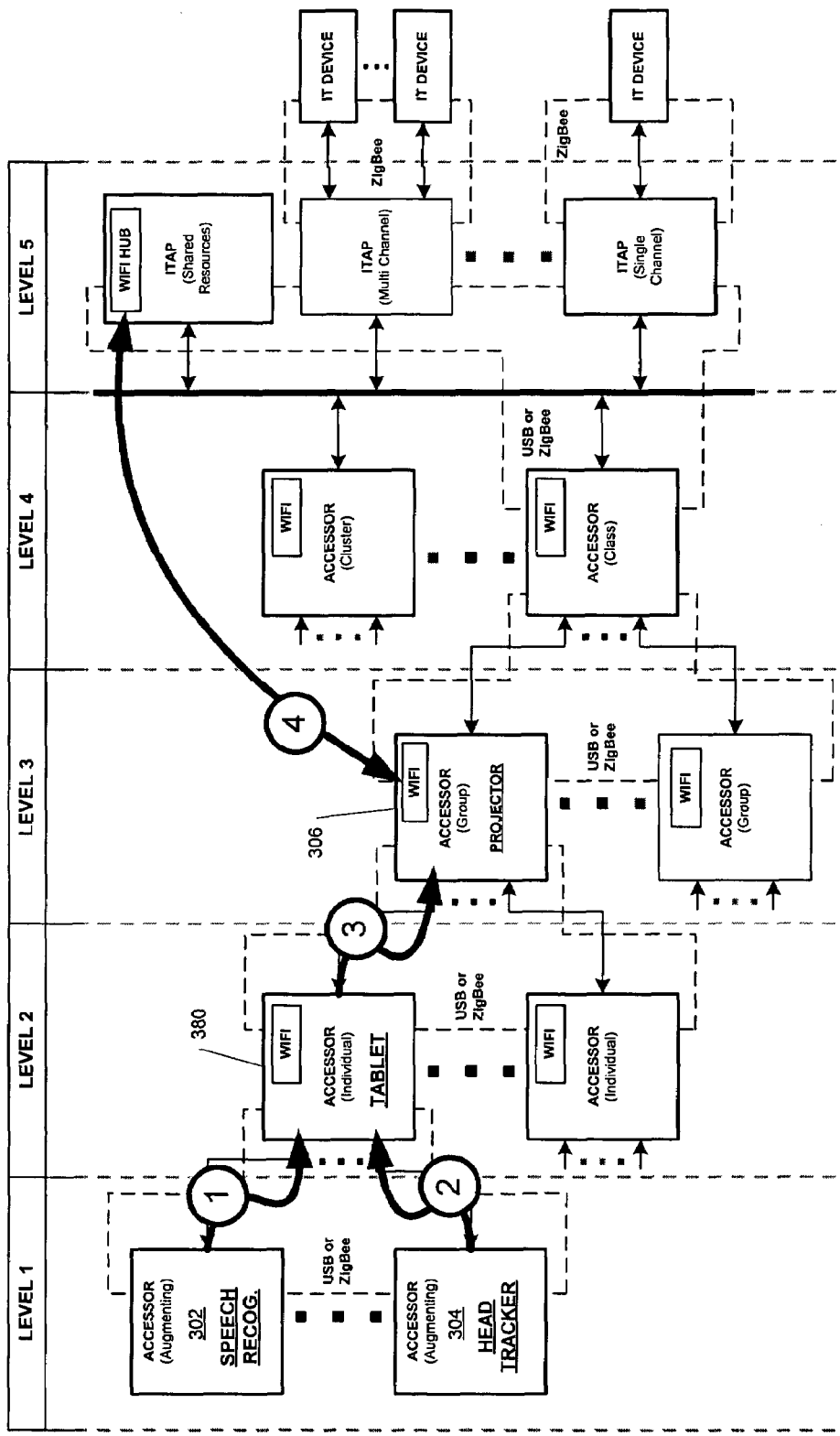
FIG. 40 illustrates an embodiment having augmenting accessors controlling a group accessor.

Consider the following scenario: Mary is a school student with a physical disability that prevents her from using a conventional keyboard and mouse. She participates in normal school activities by using a personal accessor that enables her to access all of the same information resources as her fellow students. Her personal accessor is based on a small tablet computer that would normally be controlled by a touch screen. Mary's classroom environment is depicted in FIG. 40. Because Mary cannot use the touch screen 380 on her accessor, she has two auxiliary accessors; a speech recognizer 302 for entering text and commands, and a head tracker 304 for performing mouse movement activities. The speech recognizer 302 and head tracker 304 normally behave as a keyboard and mouse for the tablet (arrows 1 and 2 in FIG. 40). At any time, however, Mary can give a command, such as "talk to group," and the output of the speech recognizer 302 will become the keyboard input on the group accessor 306 (arrow 3).

When Mary's teacher asks her to show her home page to the group she works with, she speaks a command "talk to the group" that instructs her personal accessor to rout the outputs of her speech recognizer 302 and head tracker 304 through to the group accessor 306 as standard USB keyboard and mouse packets (arrows 1, 2 and 3). Mary now has full control of the group accessor 306 and is able to open its browser by pointing to its icon with the head tracker and saying "open this." She can dictate the URL of her home page, or she may invoke a macro such as "show my home page." The group accessor 306 will access the Internet via the WiFi connection (arrow 4) and allow Mary to move on from there.

Figure 41:
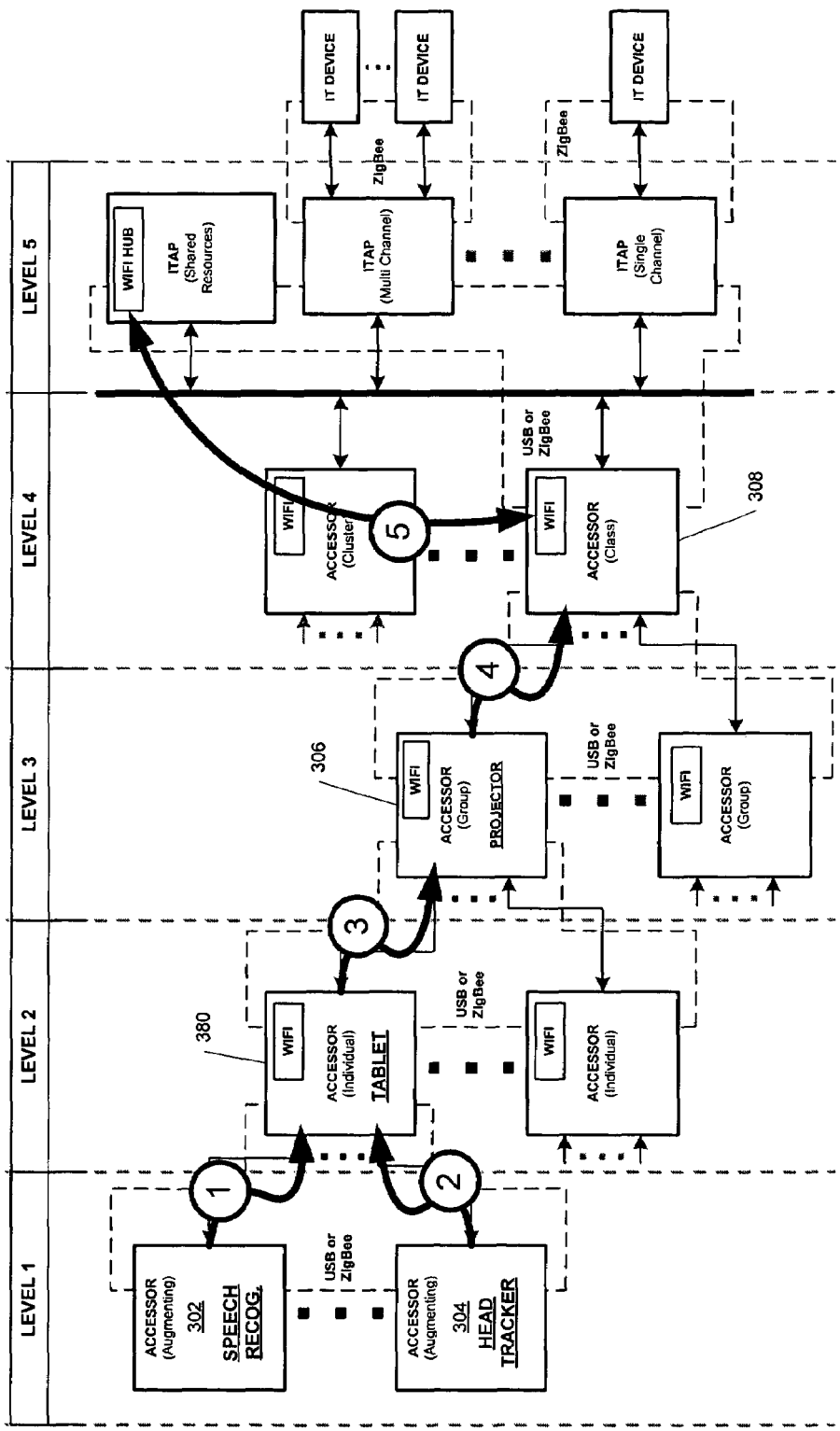
FIG. 41 illustrates augmenting accessors controlling a class accessor.

If Mary's teacher then tells her to show the whole class, Mary would say, "talk to the class" and the personal accessor would pass the ITAS packets from the speech recognition accessor 302 and head tracking accessor 304 through to the group accessor 306 as depicted in FIG. 41. The group accessor 306 would convert them to USB keyboard and mouse packets that control the class accessor 308. In this example, links 1, 2, and 3 use ITAS packets and link 4 uses standard USB HID packets. Link 5 is a standard WIFI connection.

Figure 42:
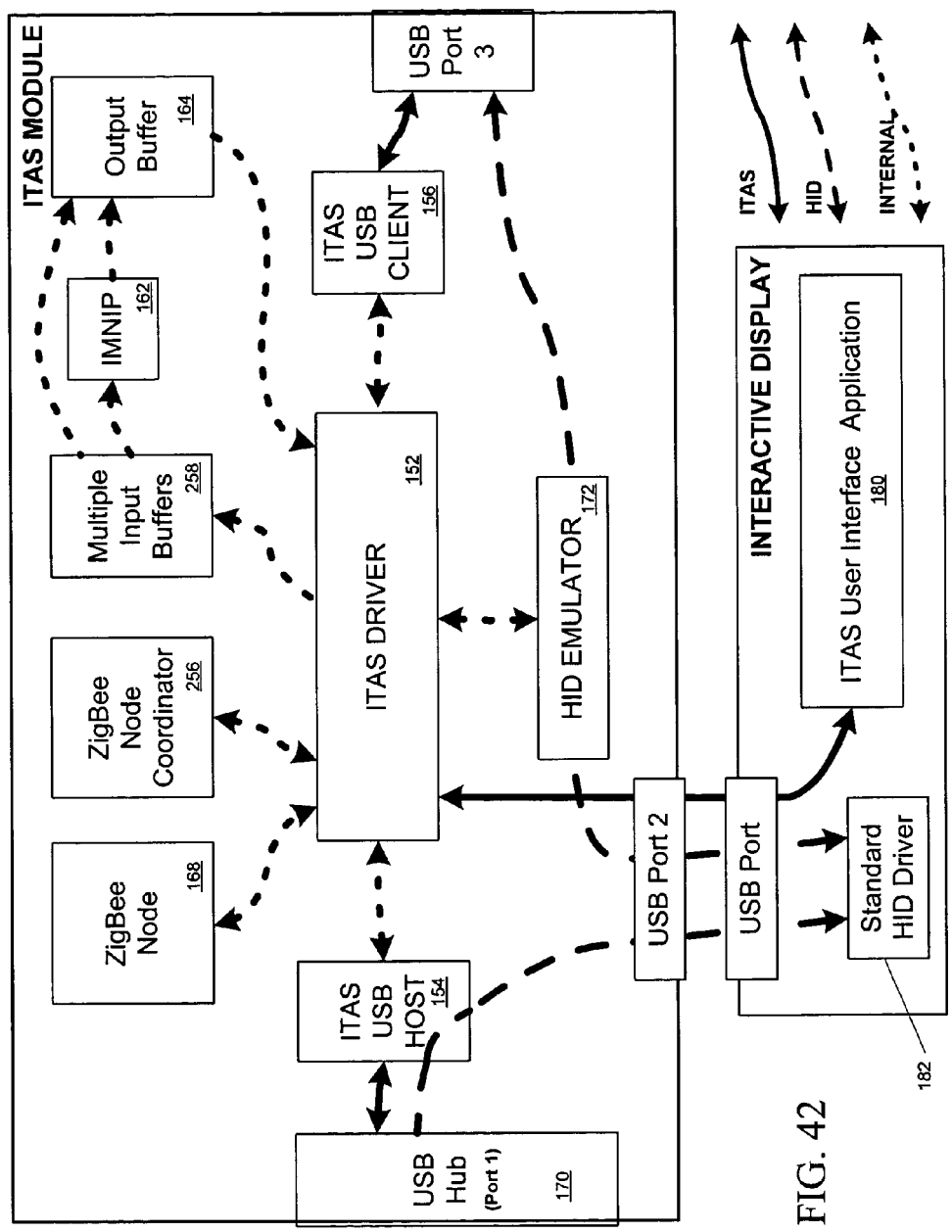
FIG. 42 illustrates data packet flow in the ITAS module and interactive display.
Figure 43:
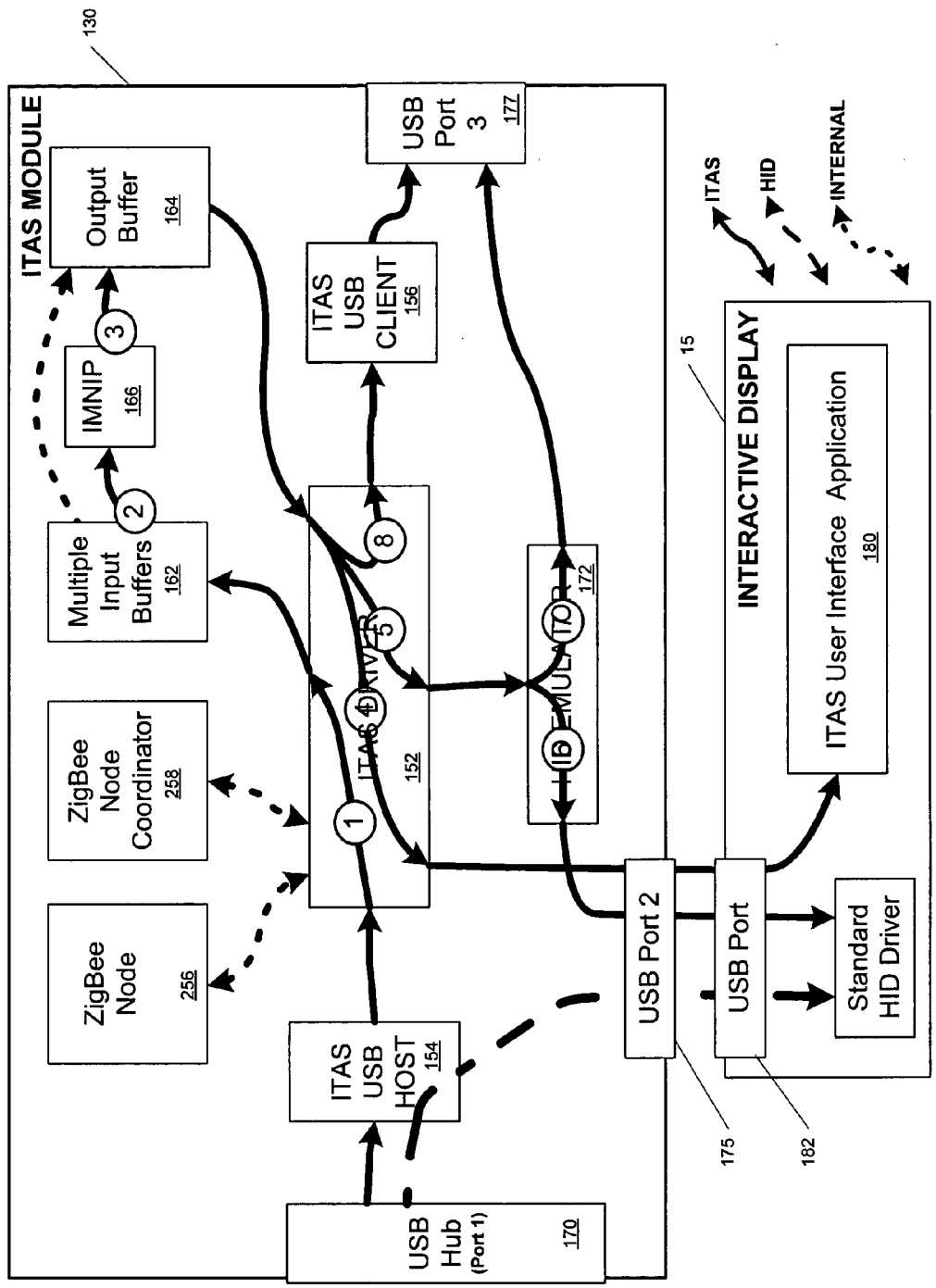
FIG. 43 illustrates routing and possible destinations for an ITAS packet that is received.

As indicated in FIG. 42, there are many different paths that must be managed to route the various types of packets (e.g., ITAS, HID, internal) to the correct destination. Furthermore, packets routed to the IMNIP 166 are converted into new packets based on the intent conveyed by the incoming packets. In some cases, the IMNIP 166 consumes several packets and outputs a single command packet for a single destination. In other cases, a single macro command packet may be expanded into a large number of packets intended for different destinations. FIG. 43 shows the possible routing of an ITAS packet received from a lower-level accessor. The data flow of the packet is described as follows with the step number referring to the same numbered arrow in the figure.

| | |
|---|---|
| Step 1: | The ITAS packet received from a lower-level accessor via USB port 1 170 has its bypass flag set to zero to indicate that it is to be passed through the IMNIP 166. The ITAS Driver 152 transfers the packet to the IMNIP input buffer 162. |
| Step 2: | Depending on the collaborate flag, the IMNIP 166 will process the contents of the input buffer as individual packets or as merged packets. |
| Step 3: | The IMNIP 166 sends all derived outputs to its output buffer 164. |
| Step 4: | If the IMNIP output is intended for the ITAS application 180 running in the attached interactive display, the ITAS driver 152 formats it into a USB ITAS packet and sends it to the application via USB port 2 175. |
| Step 5: | If the IMNIP output is intended to control either the attached interactive display or the interactive display 15 in the next-higher accessor, it is sent to the HID emulator 172 where it is converted to a standard USB Human Interface Device (HID) format. |
| Step 6: | USB commands intended for the attached interactive display 15 are sent to USB port 2 6. The interactive display 15 receives standard USB keyboard and mouse commands. |
| Step 7: | USB commands intended for the interactive display 15 attached to the next-higher accessor are sent to the USB port 3 177. The interactive display 15 receives standard USB keyboard and mouse commands. |
| Step 8: | IMNIP output intended for an ITAS driver 152 in a higher level device (accessor, ITAP or target) is formed into an ITAS packet and sent out via USB port 3 177. |

Many diagrams, similar to FIG. 43, are required to show all of the possible processing and routing combinations that must be handled by the ITAS driver 152. An almost identical set of options can be encountered with ITAS packets received from a higher-level device via USB Port 3 177. In a classroom situation, for example, a teacher may assist a student by sending commands and messages to prompt the student, to demonstrate how to perform an action on the student's interactive display, or to adjust the configuration of the student's individual accessor.

The ITAS 50 uses two basic types of packet: (i) ITAS packets to communicate between the ITAS drivers 152 in each ITAS module 50, and (ii) USB HID packets to control the standard keyboard and mouse functions in any attached interactive displays 15 or USB equipped target devices such as a personal computer. Table 4 identifies how the different types of packets are used in the ITAS and how they may be may be routed to the various devices in the system. The addressing method and flags that specify the source and destination for individual packets are discussed below.

ing packets from multiple accessors. If there is a sharing conflict with the targeted IMNIP the incoming packets are

TABLE 4

| Source | Destination | Packet Type | Function | Result |
|---|---|---|---|---|
| Level 1 | Level 2 | ITAS (ZigBee or USB) | Bypass level 2 | Send unchanged packet to higher level accessors or ITAPs |
| | | | Input to level 2 IMNIP | Send IMNIP commands to local Acc or to higher level accessors or ITAPs |
| | | | Control level 2 accessor | Control Keyboard and mouse functions on the local level 2 accessor |
| | | USB HID kb and mouse | Control level 2 accessor | Control Keyboard and mouse functions on the local level 2 accessor |
| Level 1 Level 2 | Level 3 - Group May bypass level 2 | ITAS (ZigBee or USB) | Bypass level 3 | Send unchanged packet to higher level accessors or ITAPs |
| | | | Input to level 3 IMNIP | Send IMNIP commands to local Acc or to higher level accessors or ITAPs |
| | | | Control level 3 accessor | Control Keyboard and mouse functions on the local level 3 accessor |
| | | USB HID kb and mouse | Control level 3 accessor | Control Keyboard and mouse functions on the local level 3 accessor |
| Level 1 Level 2 Level 3 | Level 4 - Cluster May bypass levels 2 & 3 | ITAS (ZigBee or USB) | Bypass level 4 | Send unchanged packet to higher level accessors or ITAPs |
| | | | Input to level 4 IMNIP | Send IMNIP commands to local Acc or to higher level accessors or ITAPs |
| | | | Control level 4 accessor | Control Keyboard and mouse functions on the local level 4 accessor |
| | | USB HID kb and mouse | Control level 4 accessor | Control Keyboard and mouse functions on the local level 4 accessor |
| Level 1 Level 2 Level 3 Level 4 | Level 5 - ITAP May bypass levels 2, 3 & 4 | ITAS (ZigBee or USB) | Bypass level 5 | Send unchanged packet to higher level ITAPs |
| | | | Input to level 5 IMNIP | Send IMNIP commands to local Acc or to higher level accessors or ITAPs |
| | | | Control level 5 ITAP | Control Keyboard and mouse functions on the local level 5 accessor |
| | | USB HID kb and mouse | Control level 5 ITAP | Control Keyboard and mouse functions on the local level 5 accessor |
| Level 1 Level 2 Level 3 Level 4 Level 5 | Level 6 - Target May bypass levels 2, , 3, 4 & 5 | ITAS (ZigBee only) | Commands for ZigBee-enabled device | Control any ZigBee-enabled functions available on the target device |
| | | USB HID kb and mouse | Control USB-equipped target device | Control Keyboard and mouse functions on the target device |

Figure 44:
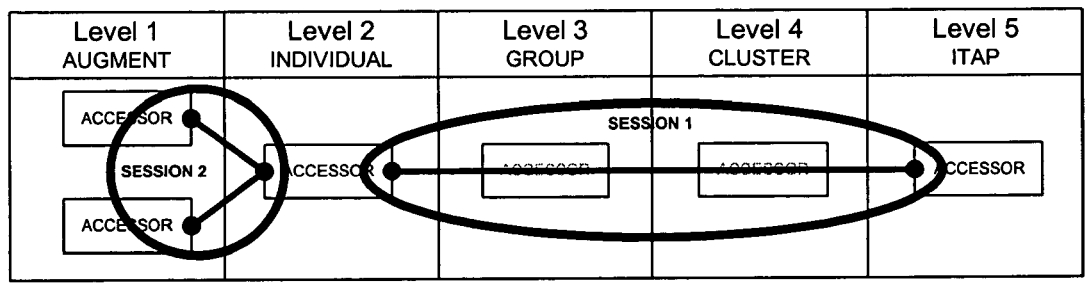
FIG. 44 illustrates session definitions for an individual accessor that is interacting with an ITAP and two augment accessors.

Sessions provide a persistent framework for interaction between accessors at different levels. In FIG. 44, for instance, there are two active sessions. Session 1 supports the interaction between an individual accessor and an ITAP. Session 2 supports the interactions between two augment accessors and the individual accessor. Accessors at the group and cluster levels are bypassed in this example and do not take part in session 1.

Figure 45:
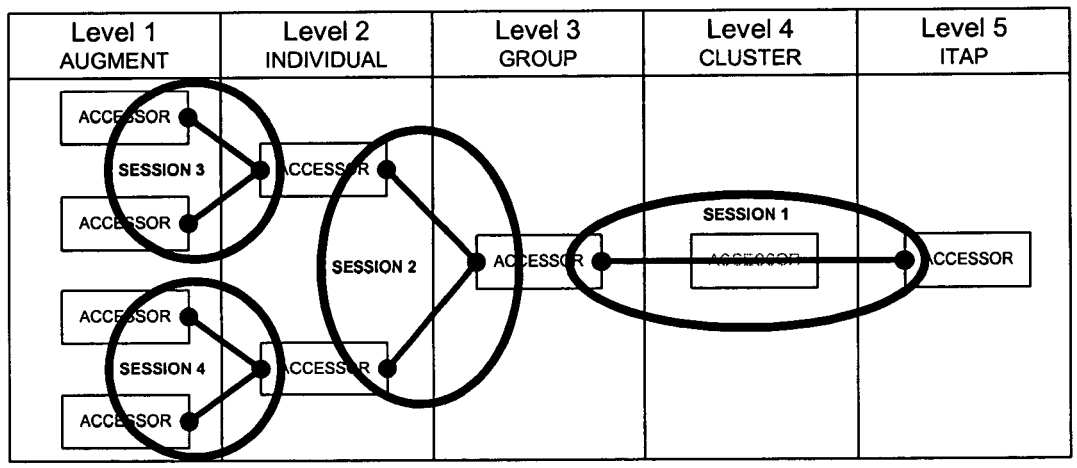
FIG. 45 illustrates session definitions for two individual accessors that are merged by a group accessor that interacts with an ITAP and two augment accessors.

FIG. 45 shows the four sessions required to support two individual accessors, each with augment accessors, a group accessor that combines the individual accessors and an ITAP that is controlled by the group accessor.

The addressing scheme adopted for the ITAS is based on the concept of levels and on the constraints imposed by USB and ZigBee addressing schemes as illustrated in FIG. 46.

Figure 47:
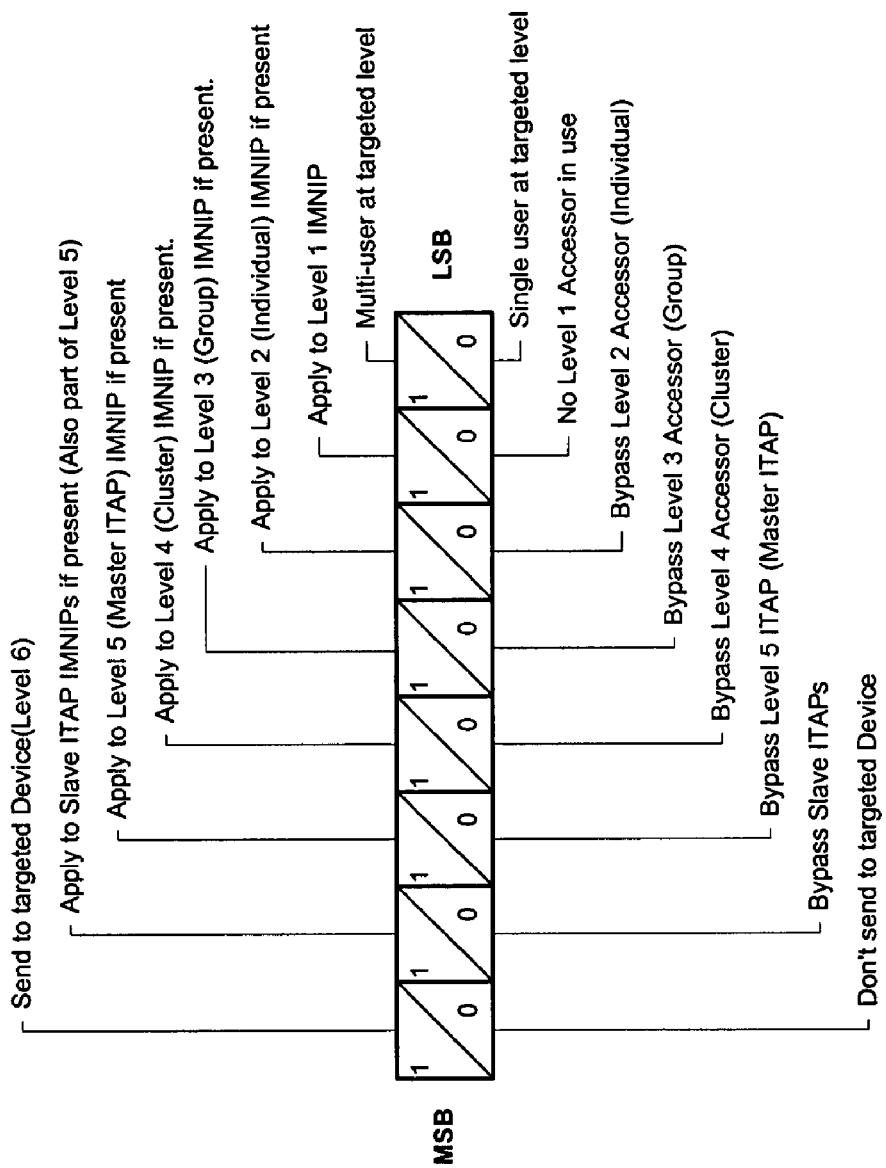
FIG. 47 illustrates bit definitions for bypass flag byte.

A bypass_flag byte is included in the header of each packet to indicate the effective source of the packet and the intended target level. The least significant bit in the bypass_flag signifies whether the targeted IMNIP is to be dedicated to processing this packet or can be simultaneously process-processed in the order they are received. FIG. 47 shows the bit definitions for the bypass flag byte.

The following examples show how the bypass flag enables the effective source accessor to specify the target level and to indicate whether the packet is to be passed on to a higher level if the targeted level is not populated.

Figure 48:
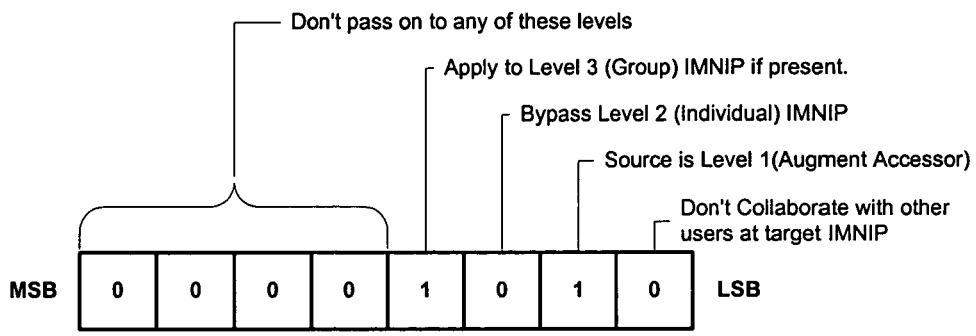
FIG. 48 illustrates a bypass flag byte for an augmenting accessor controlling a group accessor.

FIG. 48 provides an example of the bypass flag byte for an augmenting accessor controlling a group accessor. This figure shows how the bypass_flag is configured to designate the source as level 1 and the target as level 3 with the level 2 IMNIP skipped. This setting corresponds to the classroom scenario described above and in FIG. 40, which describes an individual student controlling a group accessor from a speech accessor and head tracking accessor.

Figure 49:
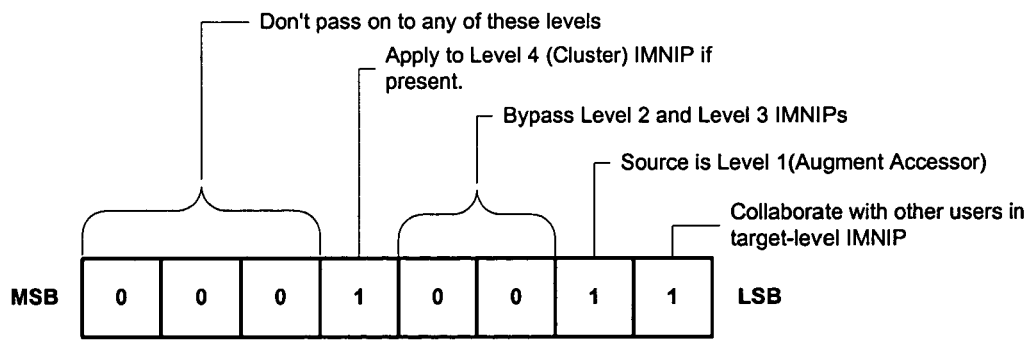
FIG. 49 provides an example of the bypass flag byte for an augmenting accessor controlling a cluster accessor collaboratively.

FIG. 49 provides an example of the bypass flag byte for an augmenting accessor controlling a cluster accessor collaboratively. The figure shows how the bypass_flag is configured to designate the source as level 1, the target as level 4, bypassing the IMNIPs at levels 2 and 3. This corresponds to the second classroom example described above and in FIG. 41. In this case, however, the collaborate flag is set to 1, indicating that multiple accessors may send messages to the IMNIP simultaneously.

Figure 50:
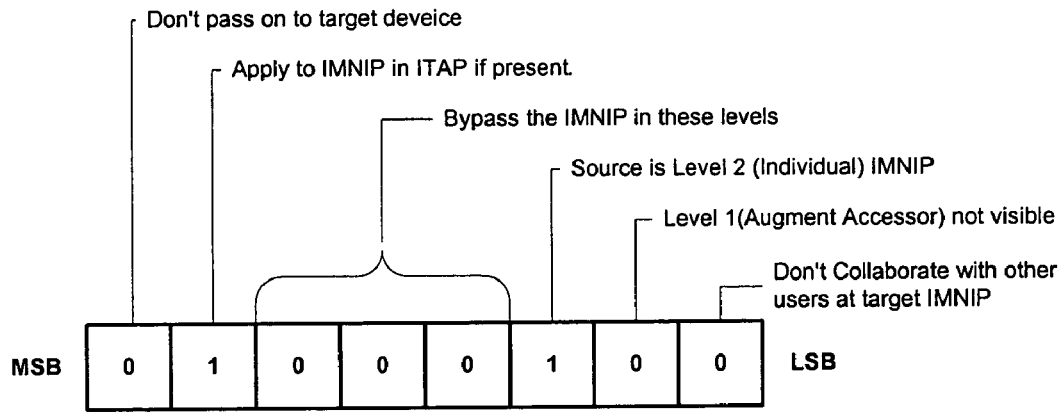
FIG. 50 provides an example of the bypass flag byte for a single individual accessor controlling an ITAP.

FIG. 50 provides an example of the bypass flag byte for a single individual accessor controlling an ITAP. The figure shows how the bypass_flag is configured to designate the source as level 2, the target as a level 6 (ITAP), bypassing the IMNIPs at levels 2, 3 and 4. This corresponds to an individual controlling an ITAP directly. The 0 bit at level 1 has no meaning because there may or may not be an augmenting accessor involved but as far as the ITAP is concerned, the source is at level 2. The collaborate flag is set to 0 in this example, indicating that the IMNIP is to process this packet independently of any others.

Figure 51:
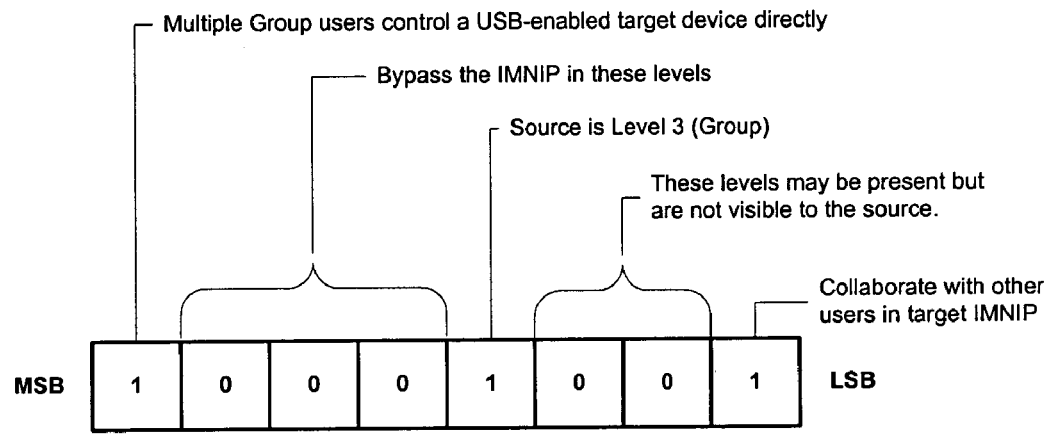
FIG. 51 provides an example of the bypass flag byte for a group accessor controlling a target device collaboratively.

FIG. 51 provides an example of the bypass flag byte for a single individual accessor controlling an ITAP. The figure shows how the bypass_flag is configured to designate the source as level 3 (group), the target as level 6 (target device), and IMNIPs at levels 4 and 5 are bypassed. The collaborate flag is set to 1 in this example, indicating that multiple sources may be fed to the target simultaneously. This corresponds to several groups controlling a USB-enabled target device directly. The 0 bits at level 1 and 2 have no meaning because there may or may not be accessors involved at these level but as far as the ITAP is concerned, the source is at level 3.

Figure 52:
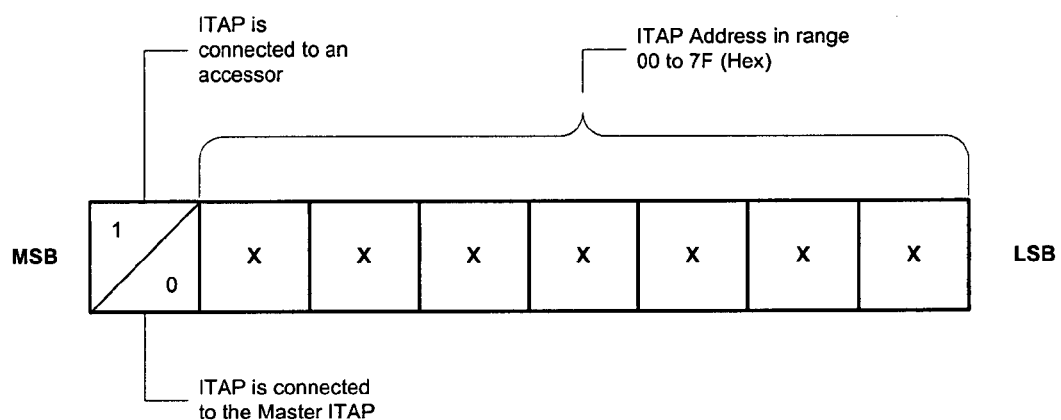
FIG. 52 illustrates bit definitions for the ITAP address byte.

Conceptually, ITAPs 200 are connected to the Master ITAP. To provide a more convenient strategy for connecting to, and controlling any of, the equipment that makes up or supports an ITAS installation, ITAPs may also be connected to the ITAS Module in any accessor. FIG. 52 shows how this flexibility is achieved by using the most significant bit of the ITAP address byte as a flag which, if set to one, indicates the ITAP is attached to an accessor and if set to zero, indicates it is connected to the master ITAP.

The accessor to which an ITAP is connected is addressed with the normal ITAS address but with all lower-level address bytes set to zero as shown in FIG. 53.

The ITAS supports message passing between any accessor or ITAP in the system. A unique capability of the ITAS is that messages may be passed as literal messages or as intent. Message packets labeled as intent are passed through a separate message IMNIP in the target ITAS module, which expands them into natural text messages in whatever language and format is required or preferred by the user. Spoken output can be provided for blind and visually impaired users, for example, and animated sign language movies can be provided for deaf users. Sending feedback information and error messages to an IMNIP as intent has three major advantages: (i) intent messages may be very short and cryptic, (ii) messages from several sources may be combined by the IMNIP, and (iii) the user messages produced by the IMNIP is interesting, natural language that can be varied each time to maintain user attention and interest. The message passing system uses the same addressing scheme as the ITAP addressing system described herein.

Those skilled in the art will appreciate that many modifications to the exemplary embodiment of the present invention are possible without departing from the spirit and scope of the present invention. In addition, it is possible to use some of the features of the present invention without the corresponding use of the other features. Accordingly, the foregoing description of the exemplary embodiment is provided for the purpose of illustrating the principles of the present invention and not in limitation thereof since the scope of the present invention is defined solely by the appended claims.

What is claimed:

1. A system for interfacing a user with an electronic device, comprising:

a plurality of accessor devices with each accessor device classified by a level at which the accessor device is connected, wherein each accessor device (i) comprises an input sensor, including at least one of a keyboard, a keypad, a mouse, an electronic tablet, a handheld device, a pointing device, a head tracker, an eye gaze tracker, a microphone, a speech recognizer, a sonar device, a camera, a biosensor, and a electromagnetic sensor, for providing a user interface matched to an access need and an ability of the user, (ii) determines an intent from a user's input actions, (iii) translates the user input actions and data into commands for the electronic device, and (iv) transfers the commands to an intelligent access port that translates the commands received from the accessor devices into an input format required by the electronic device; and a communication link that connects each accessor device with the intelligent access port to send the translated user input actions and data from each accessor device to the intelligent access port.

2. The system for interfacing a user with an electronic device of claim 1 wherein the accessor device comprises, an input processor, an interaction processor and a wireless transceiver.

3. The system for interfacing a user with an electronic device of claim 2 wherein the input processor amplifies and processes user input actions received from the input sensor and transforms electrical signals into human language descriptions of the user's actions.

4. The system for interfacing a user with an electronic device of claim 2 wherein the interaction processor merges a plurality of streams of incoming text, filters out words that are not recognized by the intelligent access port, and determines user intent from the stream of filtered text.

5. The system for interfacing a user with an electronic device of claim 2 wherein the wireless transceiver provides bi-directional streaming data between the accessor device and intelligent access port.

6. The system for interfacing a user with an electronic device of claim 1 wherein the intelligent access port comprises a wireless transceiver, an interaction processor and a device control interface.

7. The system for interfacing a user with an electronic device of claim 6 wherein the wireless transceiver provides bi-directional streaming data between the intelligent access port and the accessor device.

8. The system for interfacing a user with an electronic device of claim 6 wherein the interaction processor merges a plurality of streams of incoming text from the accessor device, filters out words that are not recognized by the intelligent access port, and determines user intent from the stream of filtered text.

9. The system for interfacing a user with an electronic device of claim 8 wherein the device control interface translates user intent into commands that are used by the electronic device.

10. The system for interfacing a user with an electronic device of claim 1 wherein at least one accessor device comprises a speech recognizer or head tracker providing for specialized user input.

11. The system for interfacing a user with an electronic device of claim 1 wherein at least one accessor device comprises an electronic tablet or handheld device including a touch screen interface providing individual user access.

12. The system for interfacing a user with an electronic device of claim 1 wherein at least one accessor device comprises a group accessor including at least one of a pointer and remote keyboard.

13. The system for interfacing a user with an electronic device of claim 12 wherein at least one accessor device comprises a cluster accessor that merges inputs received from a plurality of group accessors.

14. The system for interfacing a user with an electronic device of claim 1 wherein at least one accessor device is an intelligent access port that merges commands from a plurality of processors and generates commands for the electronic device.

15. The system for interfacing a user with an electronic device of claim 1 wherein at least one accessor device comprises an intelligent access module and an interactive display.

16. The system for interfacing a user with an electronic device of claim 1 wherein the electronic device comprises at least one of a computer, an appliance, and an electronically controlled device.

17. The system for interfacing a user with an electronic device of claim 1 wherein each accessor device comprises a cascading interface that connects the accessor device with a lower level accessor device through a communications interface.

* * * * *